United States Patent
Wasekura et al.

(10) Patent No.: US 11,448,514 B2
(45) Date of Patent: Sep. 20, 2022

(54) ROUTE INFORMATION DECISION DEVICE, ROUTE INFORMATION SYSTEM, TERMINAL, AND METHOD FOR DECIDING ROUTE INFORMATION

(71) Applicant: TOYOTA JIDOSHA KABUSHIKI KAISHA, Toyota (JP)

(72) Inventors: Masaki Wasekura, Toyota (JP); Michio Ikeda, Nagoya (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 16/659,611

(22) Filed: Oct. 22, 2019

(65) Prior Publication Data

US 2020/0141744 A1  May 7, 2020

(30) Foreign Application Priority Data

Nov. 7, 2018  (JP) .............................. JP2018-209610

(51) Int. Cl.
*G01C 21/34* (2006.01)
*G05D 1/00* (2006.01)

(52) U.S. Cl.
CPC ..... *G01C 21/3461* (2013.01); *G01C 21/3407* (2013.01); *G05D 1/0088* (2013.01)

(58) Field of Classification Search
CPC ............ G01C 21/3461; G01C 21/3407; G05D 1/0088
USPC ....................................................... 701/533
See application file for complete search history.

(56) References Cited

U.S. PATENT DOCUMENTS

| | | | | |
|---|---|---|---|---|
| 10,042,359 | B1 * | 8/2018 | Konrardy | G05D 1/0295 |
| 10,324,463 | B1 * | 6/2019 | Konrardy | G01S 19/14 |
| 10,479,377 | B2 * | 11/2019 | Nishida | B60W 50/082 |
| 10,518,769 | B2 * | 12/2019 | Sen | G08G 1/165 |
| 11,269,352 | B2 * | 3/2022 | Tao | G08G 1/0145 |
| 2002/0103599 | A1 * | 8/2002 | Sugiyama | G01C 21/3453 |
| | | | | 701/426 |

(Continued)

FOREIGN PATENT DOCUMENTS

| | | | |
|---|---|---|---|
| JP | 2015175825 A | * | 10/2015 |
| JP | 2018-018423 A | | 2/2018 |

(Continued)

OTHER PUBLICATIONS

Ibrahim et al., "Improved Route Optimization for Autonomous Ground Vehicle Navigation," 2017, Publisher: IEEE.*

(Continued)

*Primary Examiner* — Tuan C To
(74) *Attorney, Agent, or Firm* — Sughrue Mion, PLLC

(57) ABSTRACT

A route information decision device includes: a route search unit that searches for a route along which a user moves from a first spot to a second spot; a partial route decision unit that decides a permissible route part of the route and a non-permissible route part of the route, the permissible route part being contained in a permissible region where a vehicle is permitted to be dispatched to the user, the non-permissible route part being contained in a non-permissible region where the vehicle is not permitted to be dispatched to the user, the vehicle being a vehicle for which an automatic driving control is performed.

17 Claims, 14 Drawing Sheets

(56) References Cited

U.S. PATENT DOCUMENTS

| | | | |
|---|---|---|---|
| 2003/0043019 A1* | 3/2003 | Tanaka | G01C 21/26 |
| | | | 379/102.01 |
| 2007/0124066 A1* | 5/2007 | Kikuchi | G08G 1/0969 |
| | | | 701/533 |
| 2008/0016443 A1* | 1/2008 | Hiroshima | G06F 3/0482 |
| | | | 715/702 |
| 2016/0327947 A1* | 11/2016 | Ishikawa | G05D 1/021 |
| 2016/0356623 A1* | 12/2016 | Matsumoto | G01S 19/42 |
| 2017/0059342 A1* | 3/2017 | Rajendran | H04W 24/02 |
| 2018/0023966 A1* | 1/2018 | Iwai | G01C 21/3407 |
| | | | 701/423 |
| 2018/0058865 A1* | 3/2018 | Takeuchi | G01C 21/3617 |
| 2018/0113460 A1* | 4/2018 | Koda | G08G 1/09685 |
| 2019/0054926 A1 | 2/2019 | Wasekura | |
| 2019/0079519 A1* | 3/2019 | Hwang | G06Q 10/04 |
| 2019/0080264 A1 | 3/2019 | Wasekura | |
| 2019/0384299 A1* | 12/2019 | Maruyama | G05D 1/0088 |
| 2020/0317216 A1* | 10/2020 | Konrardy | B60W 30/182 |
| 2020/0334987 A1* | 10/2020 | Shoval | G06Q 10/02 |

FOREIGN PATENT DOCUMENTS

| | | | | |
|---|---|---|---|---|
| JP | 2018059860 A | * | 4/2018 | |
| JP | 2018156436 A | | 10/2018 | |
| JP | 2019-036228 A | | 3/2019 | |
| JP | 2019-053344 A | | 4/2019 | |
| WO | WO-2016139747 A1 | * | 9/2016 | B60W 50/14 |
| WO | WO-2016139748 A1 | * | 9/2016 | B60W 30/00 |
| WO | WO-2017221325 A1 | * | 12/2017 | B60W 30/12 |

OTHER PUBLICATIONS

Kyoungwook et al., "A Control System for Autonomous Vehicle Valet Parking," 2013, Publisher: IEEE.*

Hsu et al., "Route Planning of Automated Guided Vehicles," 1994, Publisher: IEEE.*

* cited by examiner

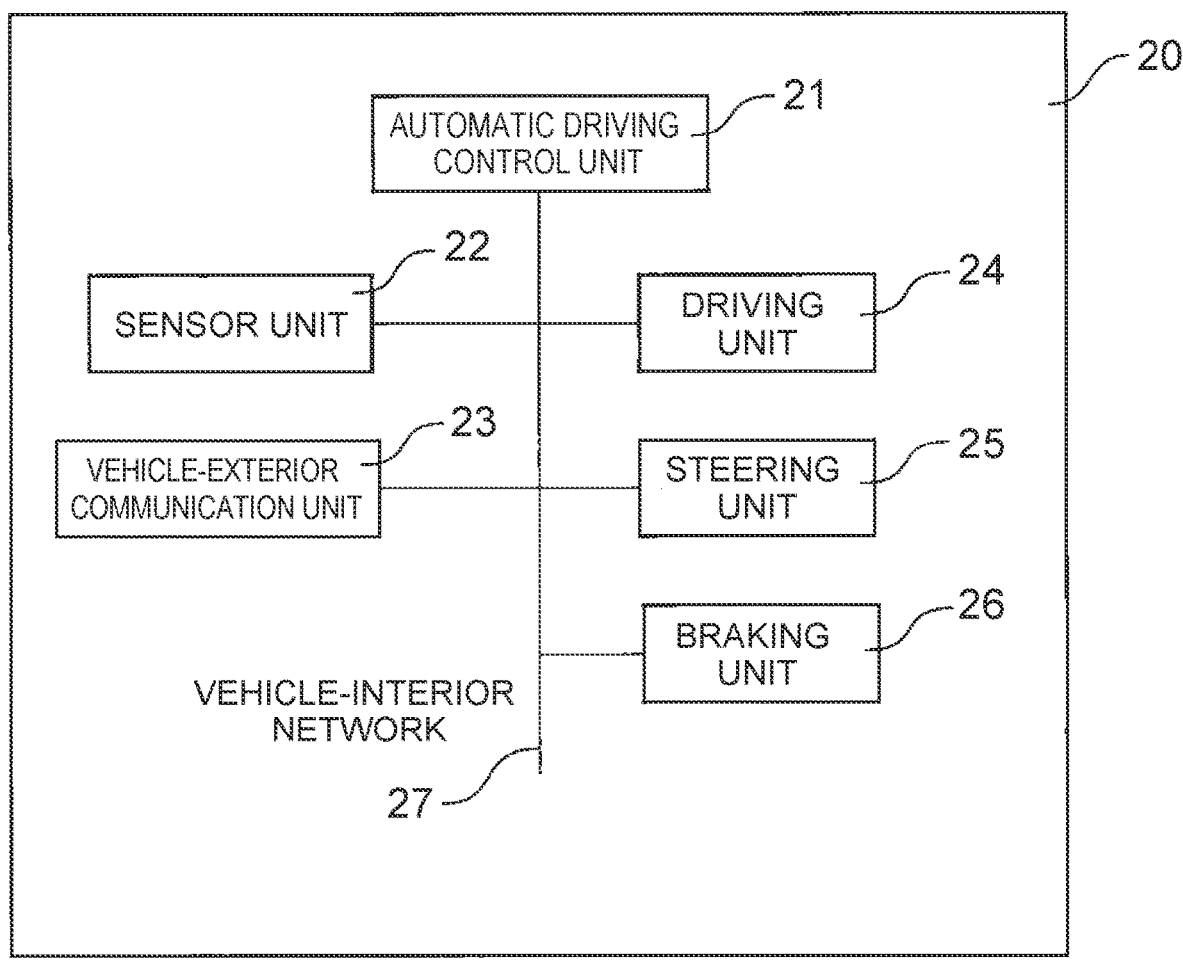

ROUTE INFORMATION DECISION DEVICE, ROUTE INFORMATION SYSTEM, TERMINAL, AND METHOD FOR DECIDING ROUTE INFORMATION

INCORPORATION BY REFERENCE

The disclosure of Japanese Patent Application No. 2018-209610 filed on Nov. 7, 2018 including the specification, drawings and abstract is incorporated herein by reference in its entirety.

BACKGROUND

1. Technical Field

The disclosure relates to a route information decision device, a route information system, a terminal, and a method for deciding route information.

2. Description of Related Art

In recent years, there has been developed an automatic driving vehicle for which driving of a vehicle is performed by an automatic driving control. In a vehicle for which the automatic driving control is performed, driving operations such as a driving, a steering and a braking, which have been conventionally performed by a human, are performed by the vehicle.

The automatic driving vehicle acquires the position of the automatic driving vehicle, using a position measurement sensor or the like, and autonomously travels along a route based on map information that is stored. On this occasion, the automatic driving vehicle acquires peripheral information, using sensors such as a camera and a radar, and thereby, safely travels while avoiding another vehicle or an obstacle.

Accordingly, for securing a safe traveling of the automatic driving vehicle, it is desirable that the automatic driving vehicle can accurately acquire the peripheral information.

Form this standpoint, it is sometimes desirable to generate the route along which the automatic driving vehicle travels, so as to avoid a place where it is hard to accurately acquire the peripheral information.

For example, setting of a region where the traveling of the automatic driving vehicle is permitted has been proposed from a standpoint of securement of safety of an occupant that rides in the automatic driving vehicle (for example, Japanese Patent Application Publication No. 2018-018423).

SUMMARY

For example, suppose that a user moves from the current place to a destination while riding in the automatic driving vehicle, using a service as a mobility.

However, in the case of setting the region where the traveling of the automatic driving vehicle is permitted, there is a possibility that the service is not provided to the user in the automatic driving vehicle in the whole of the route from the current place to the destination.

When it is unclear whether a section on the route from the current place to the destination is a section where the automatic driving vehicle can be used, there is concern that the user cannot suitably make a movement plan.

The disclosure has an object to provide a route information decision device that clarifies, on the movement route, the section where the automatic driving vehicle can be used.

A route information decision device according to an embodiment includes: a route search unit that searches for a route along which a user moves from a first spot to a second spot; and a partial route decision unit that decides a permissible route part of the route and a non-permissible route part of the route, the permissible route part being contained in a permissible region where a vehicle is permitted to be dispatched to the user, the non-permissible route part being contained in a non-permissible region where the vehicle is not permitted to dispatched to the user, the vehicle being a vehicle for which an automatic driving control is performed.

In the route information decision device, the partial route decision unit may generate display information for displaying the permissible route part and the non-permissible route part in a discriminable manner.

In the route information decision device, the partial route decision unit may estimate a first movement time, may estimate a second movement time based on a movement method for the non-permissible route part, and may notify the user of the first movement time and the second movement time, the first movement time being a time for which the user moves along the permissible route part while riding in the vehicle, the second movement time being a time for which the user moves along the non-permissible route part, the movement method being able to be selected by the user.

In the route information decision device, the route may contain a course along which the user moves from the first spot in the non-permissible region through the permissible region to the second spot, and the route information decision device may include a dispatch service unit that estimates an arrival time at which the user arrives at a border between the non-permissible region and the permissible region on the route, based on a movement method for the non-permissible route part, and that generates a dispatch instruction instructing the vehicle to arrive by the arrival time at a spot in a first predetermined range from the border, the movement method being selected by the user.

In the route information decision device, a facility in which a vehicle and a driver stand by may be disposed in a second predetermined range from a border between the permissible region and the non-permissible region, the vehicle being a vehicle for which a manual driving control is performed, the driver operating the vehicle, and the route search unit may search for the route such that the user goes through the facility.

The route information decision device may further include a permissible region decision unit that decides the permissible region and the non-permissible region based on driving environment information to possibly influence safety of traveling of the vehicle.

A route information system according to an embodiment includes: a terminal that sends a search request, the search request being a request for a search of a route along which a user moves from a first spot to a second spot; and a server including a communication unit, a route search unit that searches for the route based on the search request received using the communication unit, and a partial route decision unit that decides a permissible route part of the route and a non-permissible route part of the route, the permissible route part being contained in a permissible region where a vehicle is permitted to be dispatched to the user, the non-permissible route part being contained in a non-permissible region where the vehicle is not permitted to be dispatched to the user, the vehicle being a vehicle for which an automatic driving control is performed.

A terminal according to an embodiment includes: a communication unit; and a control unit that sends a search request to a server using the communication unit, the search request being a request for a search of a route along which a user moves from a first spot to a second spot, the server searching for the route based on the search request, the server deciding a permissible route part of the route and a non-permissible route part of the route, the permissible route part being contained in a permissible region where a vehicle is permitted to be dispatched to the user, the non-permissible route part being contained in a non-permissible region where the vehicle is not permitted to be dispatched to the user, the vehicle being a vehicle for which an automatic driving control is performed.

A method for deciding route information according to an embodiment includes a computer searching for a route along which a user moves from a first spot to a second spot, and deciding a permissible route part of the route and a non-permissible route part of the route, the permissible route part being contained in a permissible region where a vehicle is permitted to be dispatched to the user, the non-permissible route part being contained in a non-permissible region where the vehicle is not permitted to be dispatched to the user, the vehicle being a vehicle for which an automatic driving control is performed.

The above-described route information decision device in the embodiment can clarify, on the movement route, the section where the automatic driving vehicle can be used.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a hardware configuration diagram of the vehicle;

DETAILED DESCRIPTION OF EMBODIMENTS

Figure 1:
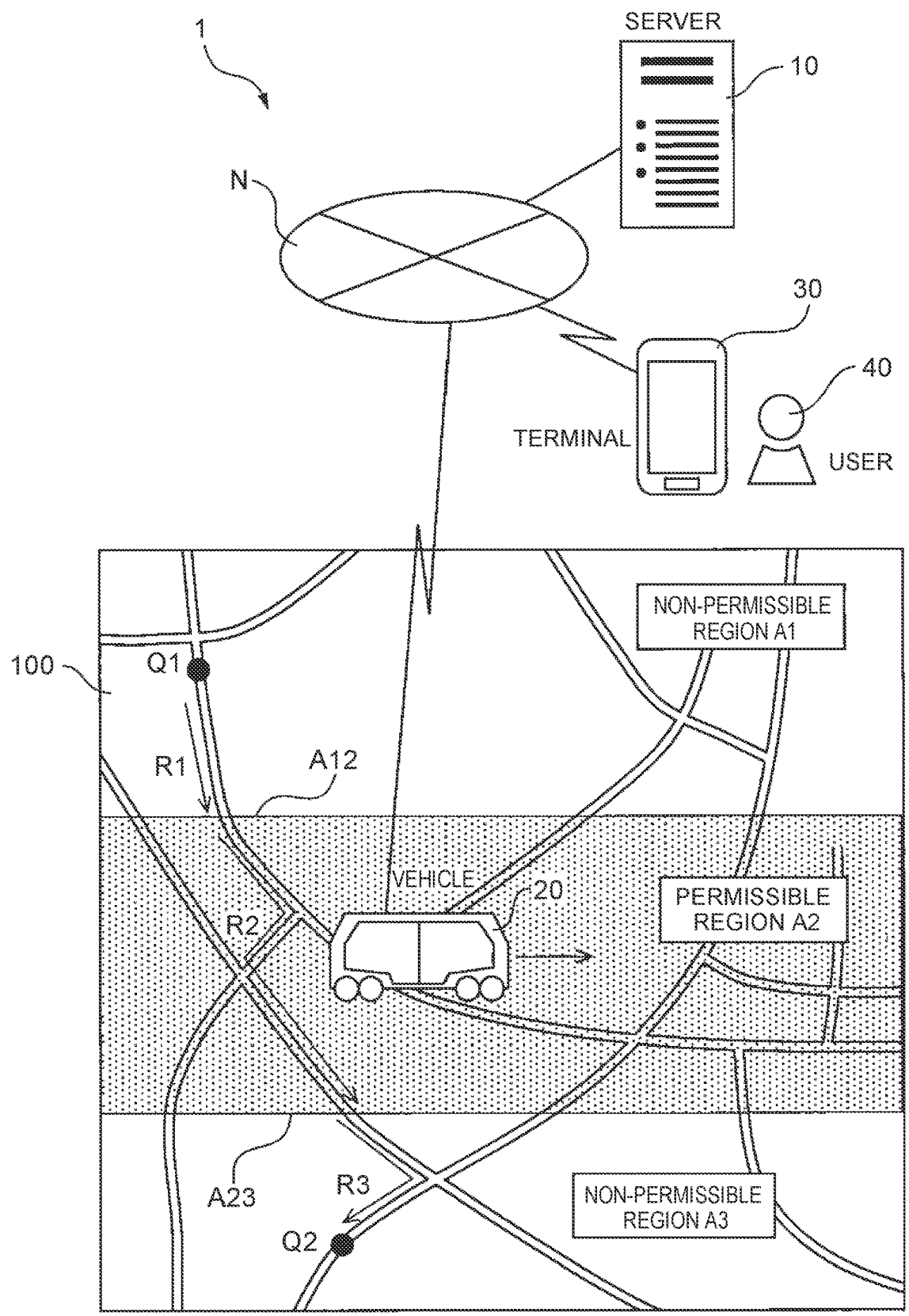
FIG. 1 is a diagram showing a configuration of an embodiment of a route information system in the embodiment.

Hereinafter, a preferred embodiment of a route information system disclosed in the present description will be described with reference to the drawing. The technical scope of the disclosure is not limited to the embodiment, and includes the disclosure described in the claims and equivalents of the disclosure.

In the route information system disclosed in the present description, for a route along which a user of an automatic driving vehicle moves from a first spot to a second spot, a server decides a permissible route part (first route part) of the route that is contained in a permissible region where the automatic driving vehicle is permitted to be dispatched to the user and a non-permissible route part (second route part) of the route that is contained in a non-permissible region where the automatic driving vehicle is not permitted to be dispatched to the user. Thereby, the system clarifies a section where the automatic driving vehicle can be used and a section where the automatic driving vehicle cannot be used, and assists the user to make a plan for the movement from the first spot to the second spot.

FIG. 1 is a diagram showing a configuration of an embodiment of a route information system disclosed in the present description.

A route information system 1 (also referred to as merely a system 1) in the embodiment includes a server 10, a vehicle 20 for which an automatic driving control is performed, and a terminal 30 that is operated by a user 40. Via an unillustrated wireless base station, the server 10 is communicably connected to the vehicle 20 and the terminal 30 through a network N.

The vehicle 20 is an automatic driving vehicle that provides a service (mobility service) as a mobility including a taxi, a bus and a ride-sharing. In FIG. 1, one vehicle 20 is illustrated, but the system 1 may include a plurality of vehicles.

At a predetermined interval or at an arbitrary time point, the server 10 decides a permissible region A2 where the vehicle 20 is permitted to be dispatched to the user 40 and non-permissible regions A1, A3 where the vehicle 20 is not permitted to be dispatched to the user 40, based on driving environment information to possibly influence safety of traveling of the vehicle 20 for which the automatic driving control is performed.

It is desirable to generate a route along which the automatic driving vehicle travels, so as to avoid a place where it is hard to accurately acquire peripheral information. From this standpoint, the server 10 can decide that regions where the peripheral information can be accurately acquired are permissible regions, based on the driving environment information. Further, the server 10 can decide that regions other than the permissible regions are non-permissible regions.

Examples of the driving environment information include weather information, traffic information, hour information and area information. Details of the driving environment information will be described later.

As shown in FIG. 1, the server 10 divides the region in a map 100 into a permissible region A2 and non-permissible regions A1, A3.

The server 10 sends information indicating the permissible region A2 and the non-permissible regions A1, A3, to the vehicle 20 through the network N.

At a predetermined interval or at an arbitrary time point, the vehicle 20 sends current position information, traveling speed information, and occupant information indicating presence or absence of an occupant, to the server 10 through the network N.

In the permissible region A2, the vehicle 20 is permitted to travel while the user 40 rides in the vehicle 20. In the permissible region A2, the vehicle 20 can move to the position of the user 40 and can travel to a destination of the user 40 while the user 40 rides in the vehicle 20, regardless of the presence or absence of the occupant.

On the other hand, in the non-permissible regions A1, A3, the vehicle 20 is not permitted to travel while the user 40 rides in the vehicle 20. Accordingly, in the non-permissible regions A1, A3, the vehicle 20 is not permitted to move to the position of the user 40 and cause the user 40 to ride in the vehicle 20. In the case of the absence of the occupant, the vehicle 20 can travel in the non-permissible regions A1, A3. However, in the embodiment, from a standpoint of safety, even in the case of the absence of the occupant, the vehicle 20 is not permitted to travel in the non-permissible regions A1, A3.

When the user 40 hopes the use of the mobility service, the user 40 sends information indicating a current place Q1 and a destination Q2, together with a route search request for a search of a route from the current place Q1 to the destination Q2, to the server 10 through the network N, using the terminal 30. The current place Q1 is in the non-permissible region A1, and the destination Q2 is in the non-permissible region A3.

The server 10 searches for a route along which the user 40 moves from the current place Q1 to the destination Q2. Then, the server 10 decides a non-permissible route part R1 of the route that is contained in the non-permissible region A1, a permissible route part R2 of the route that is contained in the permissible region A2, and a non-permissible route part R3 of the route that is contained in the non-permissible region A3. Then, the server 10 sends information indicating the permissible route part R2 and the non-permissible route parts R1, R3, to the terminal 30 through the network N.

Using the terminal 30, the user 40 watches a display of the permissible route part R2 and non-permissible route parts R1, R3 on the route along which the user 40 moves from the current place Q1 to the destination Q2. Thereby, the user 40 can clearly recognize the section of the permissible route part R2 where the vehicle 20 can be used and the sections of the non-permissible route parts R1, R3 where the vehicle 20 cannot be used.

The user 40 sends a dispatch request for requesting dispatch of the vehicle 20 for which the automatic driving control is performed, for the permissible route part R2, and requesting dispatch of vehicles for which a manual driving control is performed, for the non-permissible route parts R1, R3, to the server 10 through the network N.

The server 10 dispatches a manual driving vehicle that is operated by a driver, to the position Q1 of the user 40 in the non-permissible region A1. The user 40 gets in the manual driving vehicle at the current place Q1. The user 40 moves along the non-permissible route part R1 from the position Q1 to a border A12 between the non-permissible region A1 and the permissible region A2, while riding in the manual driving vehicle. The user 40 gets out of the manual driving vehicle at the border A12.

The server 10 dispatches the unmanned vehicle 20 for which the automatic driving control is performed, to the border A12. The user 40 gets in the vehicle 20 at the border A12. The user 40 moves along the permissible route part R2 from the border A12 to a border A23 between the permissible region A2 and the non-permissible region A3, while riding in the vehicle 20. The user 40 gets out of the vehicle 20 at the border A23.

The server 10 dispatches another manual driving vehicle that is operated by a driver, to the border A23. The user 40 gets in the vehicle 20 at the border A23. The user 40 moves along the non-permissible route part R3 from the border A23 to the destination Q2, while riding in the manual driving vehicle. In this way, the user 40 arrives at the destination Q2.

The system 1 will be described below in further detail.

Figure 2:
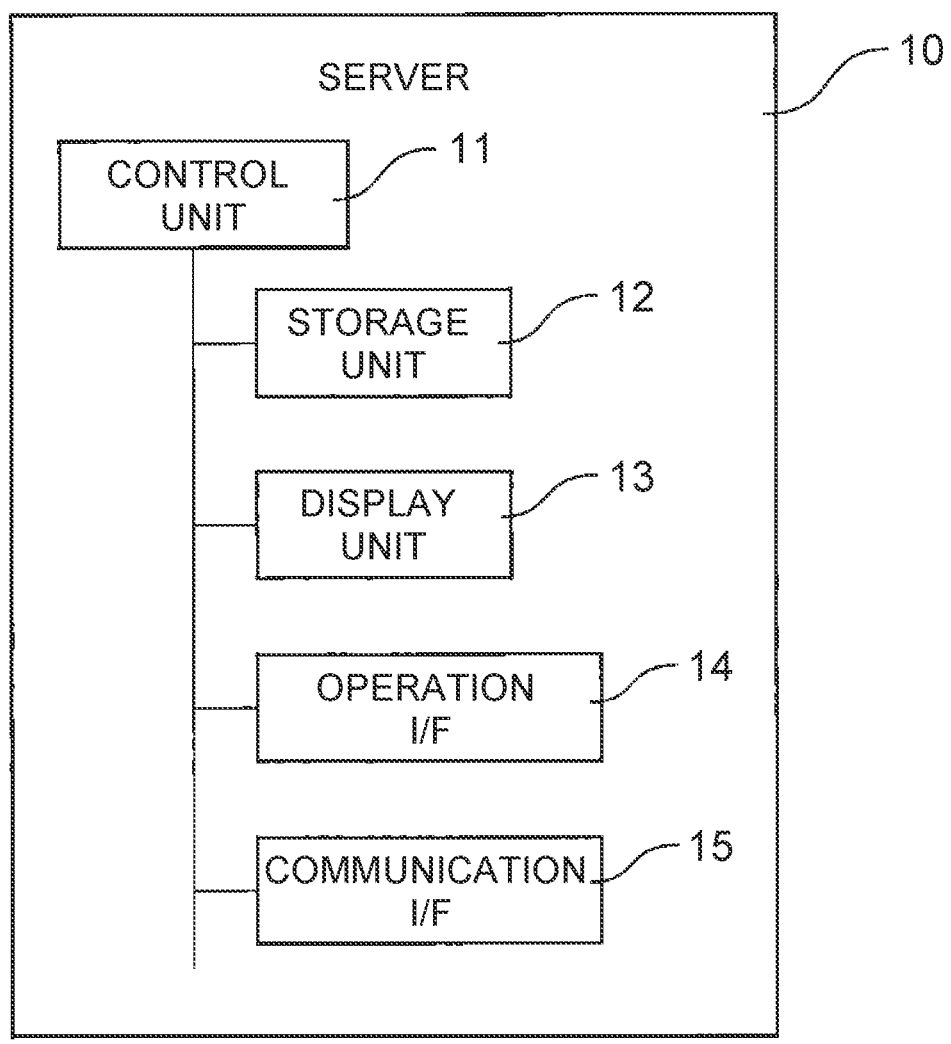
FIG. 2 is a hardware configuration diagram of a server.
Figure 3A:
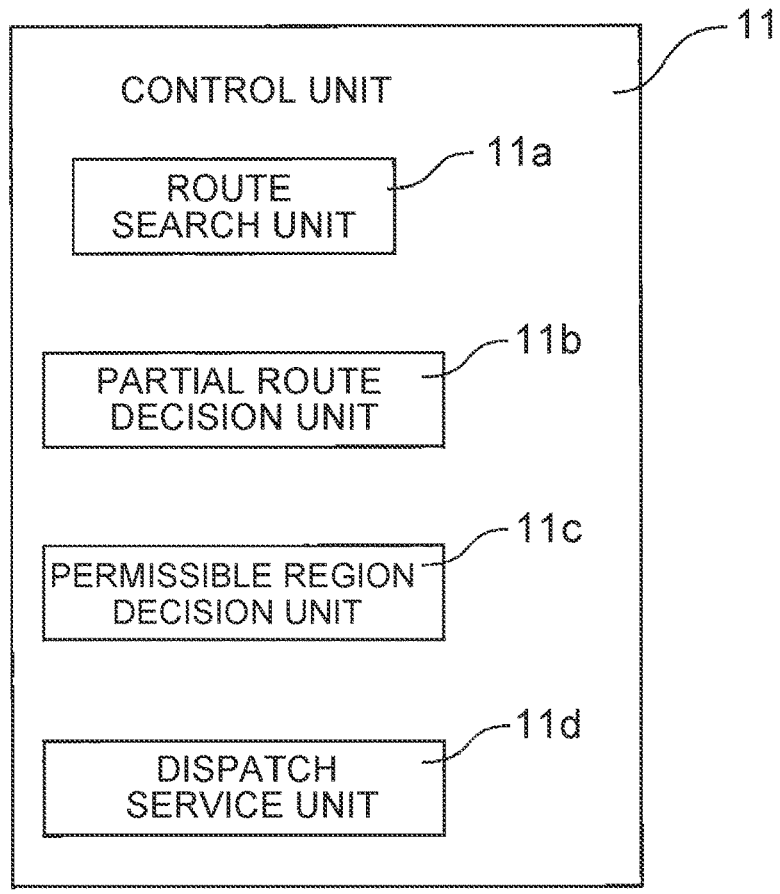
FIG. 3A is a functional block diagram of a control unit of the server.
Figure 3B:
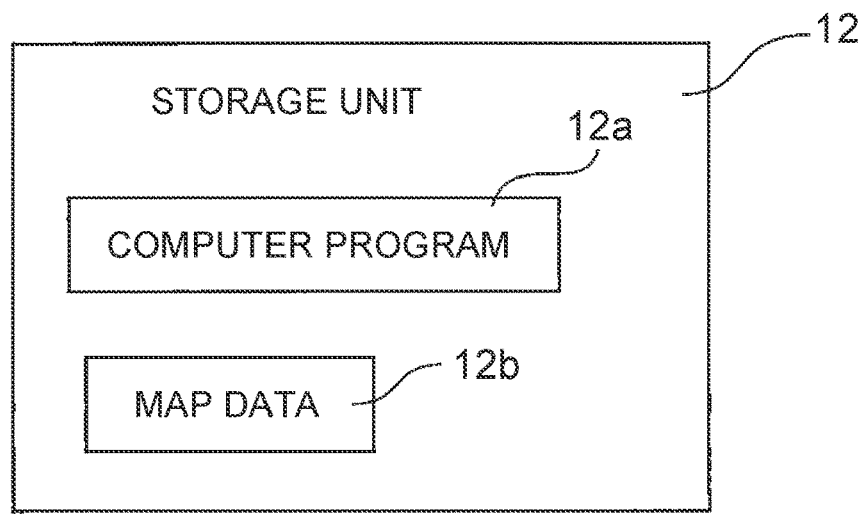
FIG. 3B is a diagram for describing a storage unit of the server.

FIG. 2 is a hardware configuration diagram of the server 10. FIG. 3A is a functional block diagram of a control unit 11 of the server 10, and FIG. 3B is a diagram for describing a storage unit of the server 10.

The server 10 includes a control unit 11, a storage unit 12, a display unit 13, an operation interface (I/F) 14, and a communication interface (I/F) 15.

The control unit 11 includes one more processors that execute computer programs for performing controls and computations in the server 10, and peripheral circuits of the processors. The control unit 11 includes a route search unit 11a, a partial route decision unit 11b, a permissible region decision unit 11c and a dispatch service unit 11d. The route search unit 11a, the partial route decision unit 11b, the permissible region decision unit 11c and the dispatch service unit 11d are realized, for example, as software modules or firmware to be executed by the processors. Processes that are performed by the route search unit 11a, the partial route decision unit 11b, the permissible region decision unit 11c and the dispatch service unit 11d will be described in detail. Each of the units included in the control unit 11 may be equipped in the server 10, as a separate circuit.

The storage unit 12 includes a storage medium such as a hard disk drive (HDD), an optical storage medium or a semiconductor memory, and stores a computer program 12a that is executed by the control unit 11. Further, the storage unit 12 stores data that is generated by the control unit 11, data that is received through the network N by the control unit 11, or the like. Further, the storage unit 12 stores map data 12b. The map data 12b includes map information. The map information includes information about a node indicating an intersection or the like on a road and information about a link indicating a section of a road that connects adjacent nodes. Further, the map information includes position information about the node and the link. The route along which the vehicle 20 travels is formed by joining links each of which connects adjacent nodes. It is preferable that the map data 12b include legal speed information associated with each link. Further, the storage unit 12 stores information relevant to the vehicle 20, as exemplified by the current position information, the traveling speed information and the occupant information.

The display unit 13, which is controlled by the control unit 11, can display a variety of information in connection with a behavior of the server 10. As the display unit 13, for example, a liquid crystal display can be used.

The operation I/F 14 is operated by an administrator of the server 10, and an operation can be input through the operation I/F 14. As the operation I/F 14, for example, a keyboard or a mouse can be used.

The communication I/F 15 includes a communication I/F circuit for connecting the server 10 to the network N, for example, through a gateway. The communication I/F 15 is configured to communicate with the vehicle 20 and the terminal 30 through the network N.

FIG. 4 is a hardware configuration diagram of the vehicle 20.

The vehicle 20 includes an automatic driving control unit 21, a sensor unit 22, a vehicle-exterior communication unit 23, a driving unit 24, a steering unit 25, and a braking unit 26, which are connected to each other through a vehicle-interior network 27. As the vehicle-interior network 27, for example, a network complying with a controller area network (CAN) standard can be used.

The automatic driving control unit 21 outputs a control signal generated such that the vehicle 20 moves to a destination along a route, based on vehicle environment information that is input from the sensor unit 22, to the driving unit 24, the steering unit 25 and the braking unit 26, and thereby, controls the behavior of the vehicle. The route of the vehicle 20 may be generated by an unillustrated navigation unit of the vehicle 20, based on the current place and destination that are input by the occupant. The automatic driving control unit 21 may receive information indicating a route that is generated by the server 10.

The sensor unit 22 sends the acquired vehicle environment information to the automatic driving control unit 21 through the vehicle-interior network 27. For example, the sensor unit 22 includes a vehicle-exterior camera, a vehicle-interior camera, a distance measurement sensor, a position measurement sensor and a vehicle speed sensor. The vehicle-exterior camera picks up the periphery of the vehicle 20, and outputs a picture of the periphery. The vehicle-interior camera picks up the interior of the vehicle 20, and outputs a picture of the interior. The automatic driving control unit 21 determines the presence or absence of the occupant, based on the picture picked up by the vehicle-interior camera, and generates the occupant information. The distance measurement sensor measures and outputs the distance to a physical body existing forward of the vehicle 20, for each direction. As the distance measurement sensor, for example, a light detection and ranging (LIDAR) sensor can be used. The position measurement sensor generates and outputs position information indicating the current place of the vehicle 20. As the position measurement sensor, for example, a global positioning system (GPS) receiver can be used. The vehicle speed sensor detects information relevant to the traveling speed of the vehicle 20. As the vehicle speed sensor, for example, a rotation speed sensor for an axle can be used.

The vehicle-exterior communication unit 23 is an in-vehicle communication device that has a wireless communication function. For example, the vehicle-exterior communication unit 23 accesses an unillustrated wireless base station that is connected to the network N through an unillustrated gateway or the like, so that the vehicle-exterior communication unit 23 is connected to the network N through the wireless base station.

The driving unit 24 generates driving power for the vehicle 20 based on the control signal, and accelerates the vehicle 20. For example, the driving unit 24 includes an engine that is an internal combustion engine, or an electric motor.

The steering unit 25 decides the running direction of the vehicle 20 based on the control signal. The steering unit 25 includes a steering mechanism that controls the orientation of a wheel of the vehicle 20.

The braking unit 26 generates braking power for the vehicle 20 based on the control signal. For example, the braking unit 26 includes a brake disc, a brake caliper and a hydraulic mechanism.

Figure 5:
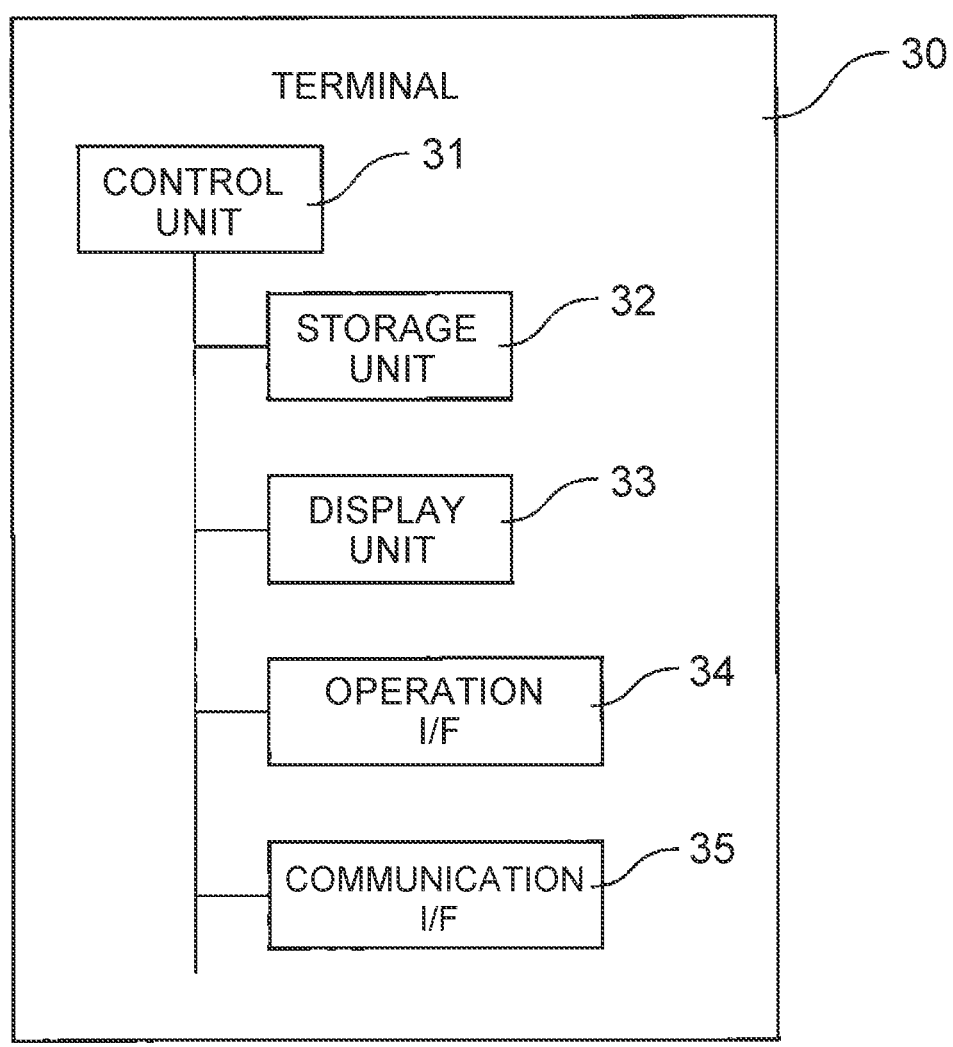
FIG. 5 is a hardware configuration diagram of a terminal.

FIG. 5 is a hardware configuration diagram of the terminal 30.

The terminal 30 includes a control unit 31, a storage unit 32, a display unit 33, an operation interface (I/F) 34, and a communication interface (I/F) 35.

The control unit 31 includes one more processors that execute computer programs for performing controls and computations in the terminal 30, and peripheral circuits of the processors. Functions of the control unit 31 are realized, for example, as software modules or firmware to be executed by the processors. Further, each of the functions of the control unit 31 may be equipped in the terminal 30, as a separate circuit.

The storage unit 32 includes a storage medium such as a hard disk drive (HDD), an optical storage medium or a semiconductor memory, and stores a computer program that is executed by the control unit 31. Further, the storage unit 32 stores data that is generated by the control unit 31, data that is received through the network N by the control unit 31, or the like.

The display unit 33, which is controlled by the control unit 31, can display a variety of information in connection with a behavior of the terminal 30. As the display unit 33, for example, a liquid crystal display can be used.

The operation I/F 34 is operated by the user 40 and an operation can be input through the operation I/F 34. As the operation I/F 34, for example, a keyboard, a mouse or a touch panel integrated with the display unit 33 can be used.

For example, the communication I/F 35 accesses an unillustrated wireless base station that is connected to the network N through an unillustrated gateway or the like, so that the communication I/F 35 is connected to the network N through the wireless base station.

Figure 6:
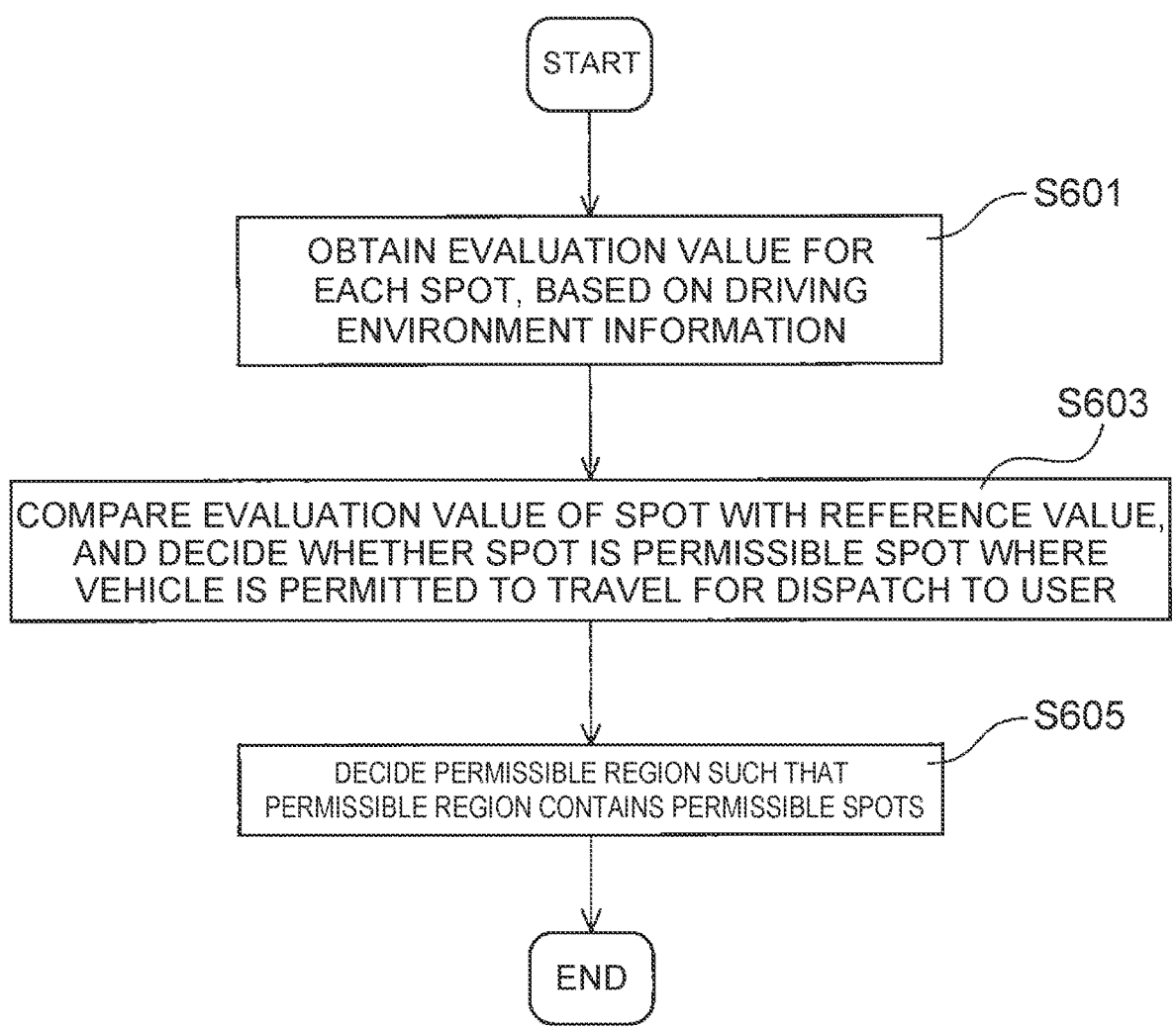
FIG. 6 is a flowchart (part 1) for describing a behavior of the server.

Next, a first process example by which the server 10 in the above-described system 1 decides the permissible region based on the driving environment information will be described below with reference to a flowchart shown in FIG. 6.

First, in step S601, the permissible region decision unit 11c of the control unit 11 of the server 10 obtains an evaluation value based on the driving environment information, for each of a plurality of spots disposed in a predetermined district.

At a predetermined interval or at an arbitrary time point, the server 10 decides the permissible region where the vehicle 20 is permitted to be dispatched to the user 40, based on the driving environment information to possibly influence the safety of the traveling of the vehicle 20 for which the automatic driving control is performed.

The predetermined district is a specified range on the map where the vehicle 20 can travel. For example, a single local public organization or a plurality of adjacent local public organizations can be specified as the predetermined district.

The spots disposed in the predetermined district are used for deciding the permissible region such that the permissible region includes spots where the vehicle 20 is permitted to travel for the dispatch to the user 40. The interval between adjacent spots may be in a range of 10 m to 1000 m, for example.

As described above, the weather information, the traffic information, the hour information and the area information can be used as the driving environment information.

Examples of the weather information include precipitation amount, rainfall amount, snowfall amount, heavy rain warning, surface rain amount index, river flood forecasting, landslide disaster alerting information, tornado watch information, large-scale tidal wave warning, tidal wave warning, tidal wave watch information, eruption warning, eruption forecasting, ash fall forecasting, volcanic gas forecasting, tide level observation information, and high-wave warning.

At a spot with a high precipitation amount, rain or snow can influence the information about the position of the vehicle 20 and the periphery, which is information to be acquired by the vehicle 20, and therefore, it preferable to permit the traveling of the vehicle 20 at a spot with a low precipitation amount.

Further, it is preferable to permit the traveling of the vehicle 20 at a spot that is not subjected to flooding, mudslide, strong wind, tidal wave, cinder and ash fall.

The server 10 can acquire the weather information that is provided by a public institution or a private group, through the network N. Further, the administrator of the server 10 may input the weather information to the server 10.

Examples of the traffic information include the traffic volume and traveling speed at a spot where the vehicle 20 can travel. At a spot where the traffic volume is large (the traveling speed is lower than the legal speed), many vehicles are traveling, and a vehicle other than the automatic driving vehicle is sometimes traveling. For example, there is concern that the vehicle 20 performs a sudden braking in response to an unpredictable traveling of the vehicle other than the automatic driving vehicle. Further, there is concern that the occupant riding in the vehicle 20 feels unsafe by seeing the traveling of the vehicle other than the automatic driving vehicle. Accordingly, it is preferable to permit the traveling of the vehicle 20 at a spot where the traffic volume is small.

The server 10 can acquire the traffic information that is provided by a public institution or a private group, through the network N. Further, the administrator of the server 10 may input the traffic information to the server 10. Further, the vehicle 20 may send information indicating the current traveling speed, together with information indicating the spot where the vehicle 20 is traveling, to the server 10 through the network N, and the server 10 may acquire the traveling speed at each spot.

Examples of the hour information include a time period of daytime at the spot. For example, in the case where brightness influences the peripheral information that is acquired by the vehicle 20, it is preferable to permit the traveling of the vehicle 20 in a time period when the periphery is bright. The server 10 can acquire the hour information that is provided by a public institution or a private group, through the network N. Further, the administrator of the server 10 may input the hour information to the server 10.

Examples of the area information include position information about school roads and places where construction is being performed. At a spot through which elementary students and the like commute, it is preferable to permit the traveling of the vehicle 20 in a time period other than a time period for the commuting. Further, it is preferable to permit the traveling of the vehicle 20 at a spot where construction is not being performed.

Further, examples of the area information include disposition information about equipment for assisting the traveling of the automatic driving vehicle. Examples of the disposition information include information about a region where a beacon device to send the state of a traffic light to the vehicle 20 is disposed. At a spot contained in a region where the beacon device is disposed, the vehicle 20 receives information that is sent from the beacon device, using an unillustrated beacon receiver. The vehicle 20 can determine the state of the traffic light, not only based on the picture of the traffic light that is picked up by the vehicle-exterior camera but also based on the information that is sent from the beacon device. However, at a spot contained in a region where the beacon device is not disposed, there is no information that is sent from the beacon device, and therefore, the vehicle 20 determines the state of the traffic light, based on the picture of the traffic light that is picked up by the vehicle-exterior camera. Accordingly, it is preferable to permit the traveling of the vehicle 20, at the spot contained in the region where the beacon device to send the state of the traffic light to the vehicle 20 is disposed.

Further, examples of the area information include information about a region where the map information is prepared. In the case where the vehicle 20 travels at a spot contained in the region where the map information is prepared, the vehicle 20 can control the traveling, not only based on the peripheral information acquired using the sensors but also based on the map information. However, at a spot contained in a region where the map information is not prepared, there is no map information, and therefore, the vehicle 20 controls the traveling based on the peripheral information acquired using the sensors. Accordingly, it is preferable to permit the traveling of the vehicle 20, at the spot contained in the region where the map information is prepared.

For example, the above-described area information is associated with the spot where the vehicle 20 can travel, and is input to the server 10 by the administrator of the server 10.

The permissible region decision unit 11*c* may obtain the evaluation value based on the above-described plurality of kinds of driving environment information. For example, the permissible region decision unit 11*c* can obtain an evaluation value f, using the following Expression (1).

$$f = F(\alpha, \beta, \gamma, \delta) \tag{1}$$

Here, $\alpha$ is a value that is decided based on the weather information about the spot. For example, when the precipitation amount is equal to or higher than a predetermined value, $\alpha$ may be set to 1, and when the precipitation amount is lower than the predetermined value, $\alpha$ may be set to 0. Further, the surface rain amount index may be used as $\alpha$. Further, the permissible region decision unit 11*c* may decide $\alpha$ based on a plurality of kinds of weather information including the precipitation amount, the heavy rain warning and the surface rain amount index.

Further, $\beta$ is a value that is decided based on the traffic information about the spot. For example, $\beta$ may be the traffic volume or traveling speed at the spot. The traffic volume or traveling speed at the spot can be decided as a numerical value in a range of 0 to 1. Here, when the traffic volume is large or the traveling speed is low, $\beta$ may be set to 1, and when the traffic volume is small or the traveling speed is high, $\beta$ may be set to 0. Further, the permissible region decision unit 11*c* may decide $\beta$, based on a plurality of kinds of traffic information including the traffic volume and the traveling speed.

Further, $\gamma$ is a value that is decided based on the hour information about the spot. For example, when the hour at the spot is in a time period of night, $\gamma$ may be set to 1, and when the hour at the spot is in a time period of daytime, $\gamma$ may be set to 0.

Further, $\delta$ is a value that is decided based on the area information about the spot. For example, when the spot is contained in a school road and the hour at the spot is in a time period of commuting, $\delta$ may be set to 1, and when the spot is not contained in a school road or when the spot is contained in a school road but the hour at the spot is not in a time period of commuting, $\delta$ may be set to 0. When the spot is contained in a region where construction is being performed, $\delta$ may be set to 1, and when the spot is not contained in a region where construction is being performed, $\delta$ may be set to 0. When the spot is contained in a region where the equipment for assisting the traveling of the automatic driving vehicle is not disposed, $\delta$ may be set to 1, and when the spot is contained in a region where the equipment is disposed, $\delta$ may be set to 0. When the spot is contained in a region where the map information is not prepared, δ may be set to 1, and when the spot is contained in a region where the map information is prepared, δ may be set to 0. Further, the permissible region decision unit 11c may decide δ based on a plurality of kinds of area information.

The permissible region decision unit 11c obtains the evaluation value f based on Expression (1). As the function F(α,β, γ,δ) in Expression (1), for example, a function for obtaining the sum of the arguments α,β, γ,δ, or a function for obtaining the average or weighted average of the arguments α,β, γ,δ can be used. For example, the evaluation value f is decided so as to decrease as the safety of the traveling of the vehicle 20 at the spot is higher.

Next, in step S603, for each of the plurality of spots that is disposed in the predetermined district, the permissible region decision unit 11c compares the evaluation value of the spot with a reference value, and decides whether the spot is a permissible spot where the vehicle 20 is permitted to travel for the dispatch to the user 40. For example, in the case where the evaluation value of the spot is lower than the reference value, the permissible region decision unit 11c decides that the spot is a permissible spot where the vehicle 20 is permitted to travel for the dispatch to the user 40.

The permissible region decision unit 11c may decide whether the spot is a permissible spot where the vehicle 20 is permitted to travel for the dispatch to the user 40, by comparing the value of one of α,β, γ and δ with a reference value for each spot, instead of obtaining the evaluation value f of the spot using Expression (1).

Next, in step S605, the permissible region decision unit 11c decides the permissible region, such that the permissible region contains permissible spots. Further, the permissible region decision unit 11c decides that the region other than the permissible region in the district is a non-permissible region where the traveling of the vehicle 20 is not permitted.

In the case where the ratio of the number of the permissible spots to the total number of the spots disposed in the district is equal to or higher than a predetermined ratio, the permissible region decision unit 11c may decide that the whole of the district is a permissible region. This is because when the permissible region and the non-permissible region are mixed in one district, an event such as the search of a roundabout route occurs, so that there is concern of interference with a smooth traveling of the vehicle 20. For example, the predetermined ratio may be 50% to 90%. In the case where the ratio of the number of the permissible spots contained in the district to the total number of the spots contained in the district is lower than the predetermined ratio, the permissible region decision unit 11c may decide that the whole of the district is a non-permissible region.

Figure 7:
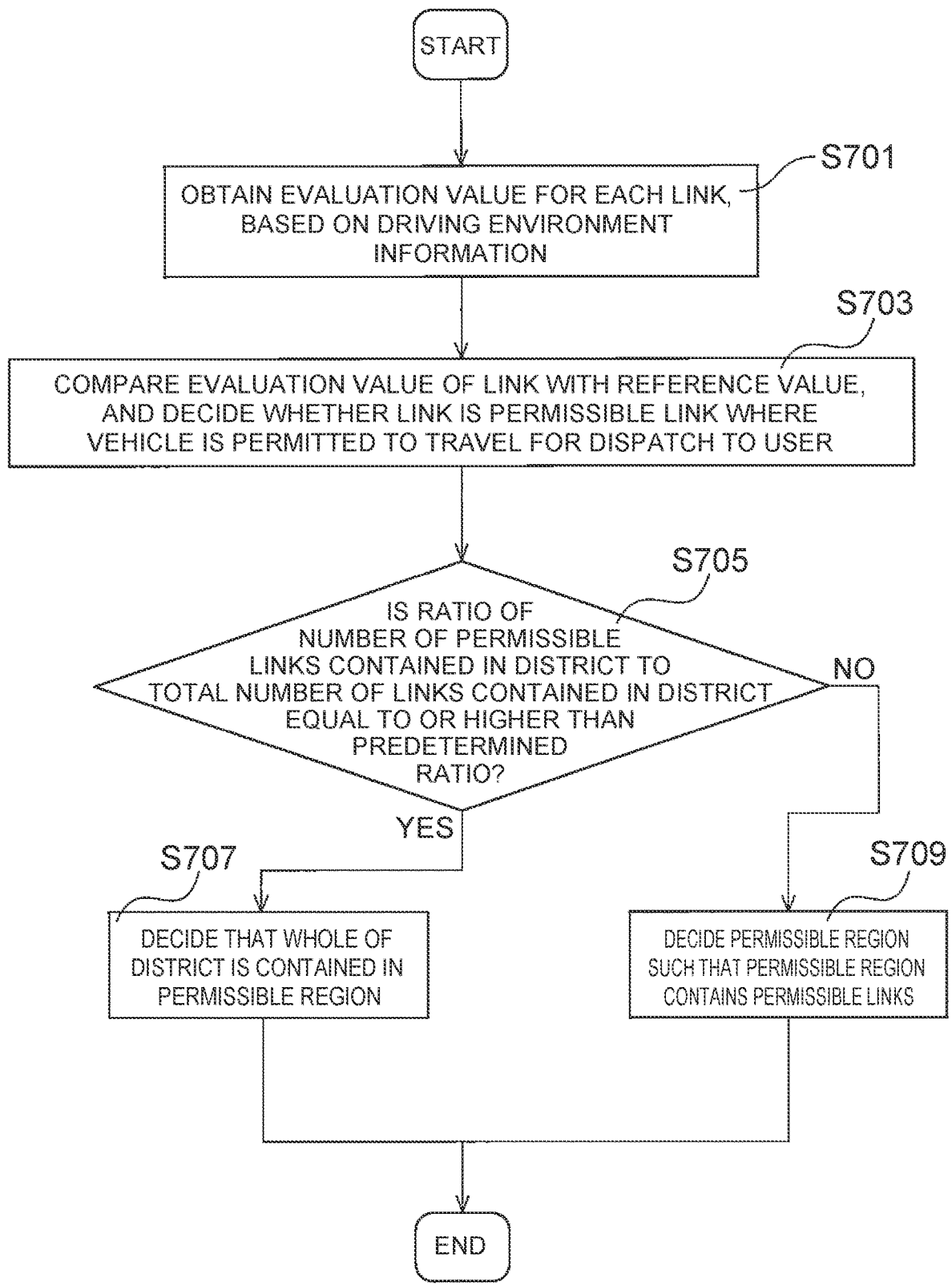
FIG. 7 is a flowchart (part 2) for describing a behavior of the server.

Next, a second process example by which the server 10 in the above-described system 1 decides the permissible region based on the driving environment information will be described below with reference to a flowchart shown in FIG. 7.

In the second process example, for each of links that connect adjacent nodes disposed in a predetermined district, the permissible region decision unit 11c decides whether the link is a permissible link where the vehicle 20 is permitted to travel for the dispatch to the user 40, and decides the permissible region, such that the permissible region contains permissible links.

First, in step S701, the permissible region decision unit 11c of the control unit 11 in the server 10 obtains the evaluation value for each of links disposed in the district, based on the driving environment information. The above description of the driving environment information about the spot is applied to the driving environment information about the link, by replacing the spot with the link, when necessary. The permissible region decision unit 11c acquires the position information about the link, with reference to the map data 12b stored in the storage unit 12. Here, the permissible region decision unit 11c may use the position of one of the nodes at both ends or the average of the positions of the nodes at both ends of the link, as the position of the link for acquiring the driving environment information.

Next, in step S703, for each of a plurality of links disposed in a predetermined district, the permissible region decision unit 11c compares the evaluation value of the link with a reference value, and decides whether the link is a permissible link where the vehicle 20 is permitted to travel for the dispatch to the user 40.

The permissible region decision unit 11c may decide whether the link is a permissible link where the vehicle 20 is permitted to travel for the dispatch to the user 40, by comparing the value of one of α,β, γ and δ with a reference value for each link, instead of obtaining the evaluation value f of the link using Expression (1).

Next, in step S705, the permissible region decision unit 11c determines whether the ratio of the number of the permissible links contained in the district to the total number of the links contained in the district is equal to or higher than a predetermined ratio.

In the case where the ratio of the number of the permissible links contained in the district to the total number of the links contained in the district is equal to or higher than the predetermined ratio (step S705, Yes), the permissible region decision unit 11c decides that the whole of the district is a permissible region (step S707). This is because when the permissible region and the non-permissible region are mixed in one district, an event such as the search of a roundabout route occurs, so that there is concern of interference with a smooth traveling of the vehicle 20. For example, the predetermined ratio may be 50% to 90%.

On the other hand, in the case where the ratio of the number of the permissible links contained in the district to the total number of the links contained in the district is lower than the predetermined ratio (step S705, No), the permissible region decision unit 11c decides the permissible region such that the permissible region contains the permissible links (step S709). Further, the permissible region decision unit 11c decides that the region other than the permissible region in the district is a non-permissible region where the vehicle 20 is not limited to travel for the dispatch to the user 40. In the case where the ratio of the number of the permissible links contained in the district to the total number of the links contained in the district is lower than the predetermined ratio, the permissible region decision unit 11c may decide that the whole of the district is a non-permissible region. The process of step S705 may be omitted.

The process by which the server 10 decides the permissible region and the non-permissible region has been described above.

Figure 8:
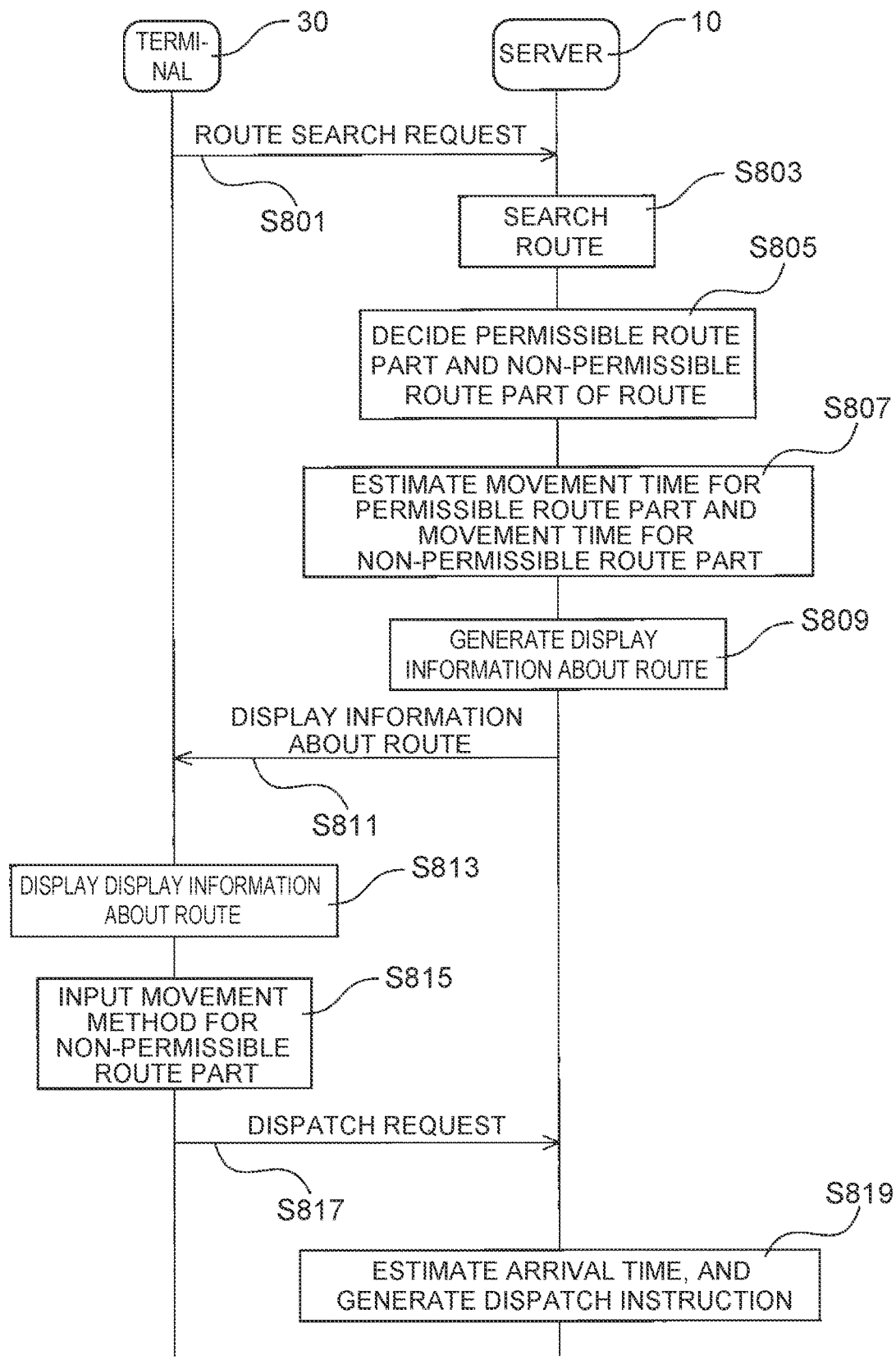
FIG. 8 is a sequence diagram (part 1) for describing a behavior of the system.
Figure 9:
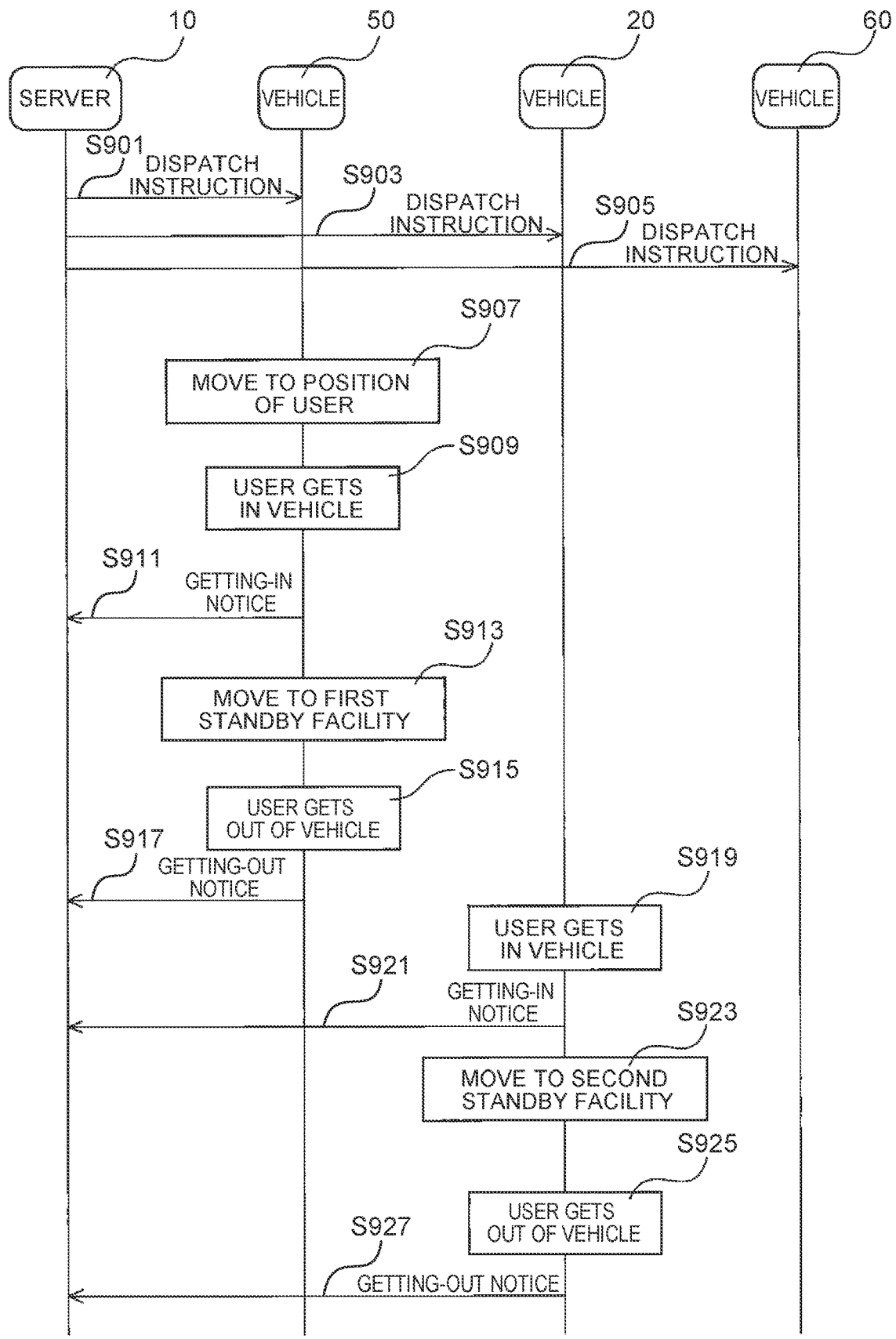
FIG. 9 is a sequence diagram (part 2) for describing a behavior of the system.
Figure 10:
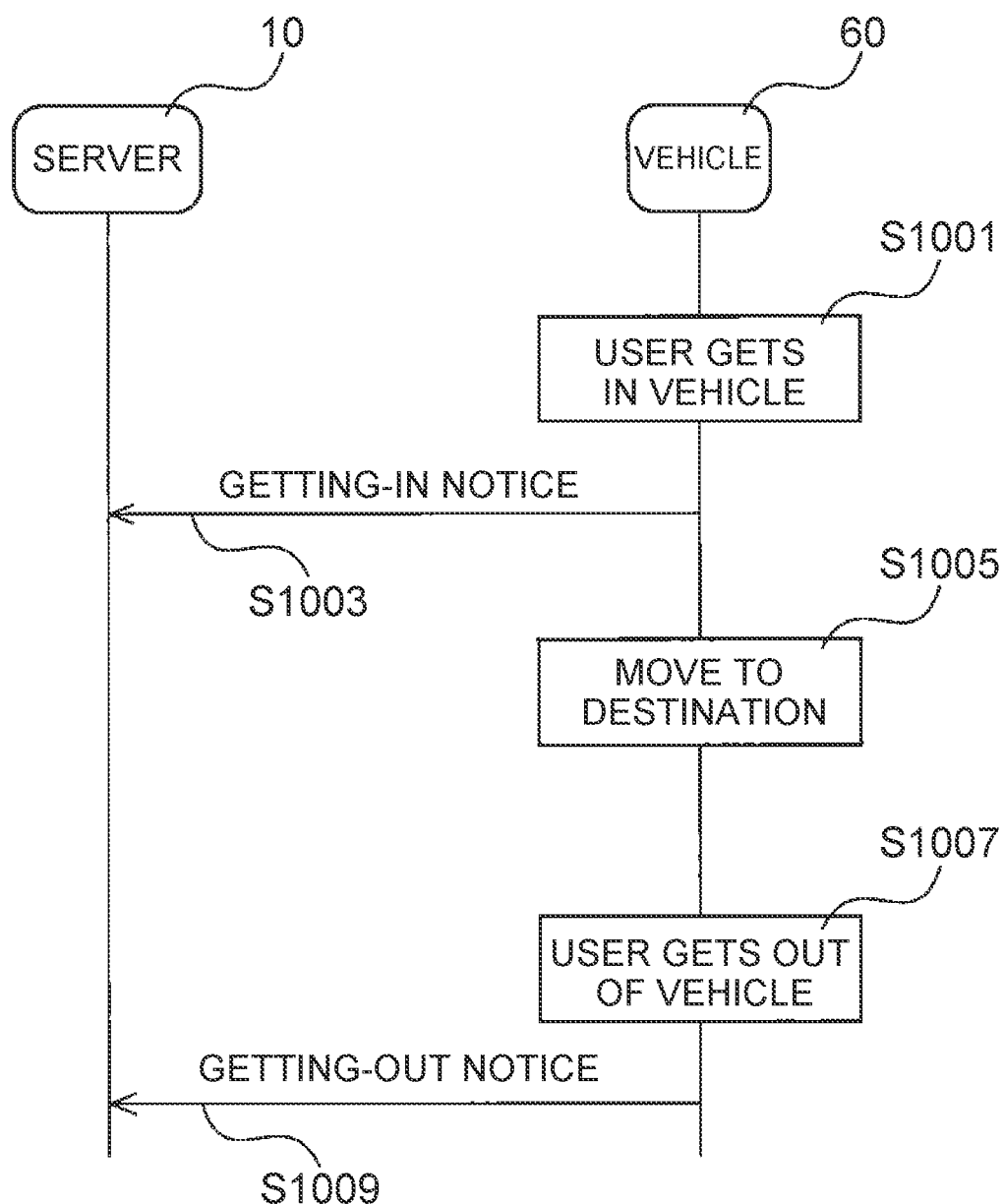
FIG. 10 is a sequence diagram (part 3) for describing a behavior of the system.

Next, a first behavior example when the above-described system 1 provides the mobility service for transporting the user 40 to the destination will be described below, with reference to sequence diagrams shown in FIG. 8 to FIG. 10.

First, in step S801, using the terminal 30, the user 40 sends the information indicating the current place and the destination, to the server 10 through the network N, together with the route search request for the search of the route from the current place to the destination. As the current place and the destination, for example, facility name, address or combination of latitude and longitude can be used.

Next, in step S803, the route search unit 11a of the control unit 11 in the server 10 searches for the route from the current place of the user 40 to the destination, with reference to the map data 12b stored in the storage unit 12. For example, the route search unit 11a may search for the route, using a Dijkstra's algorithm.

Figure 11:
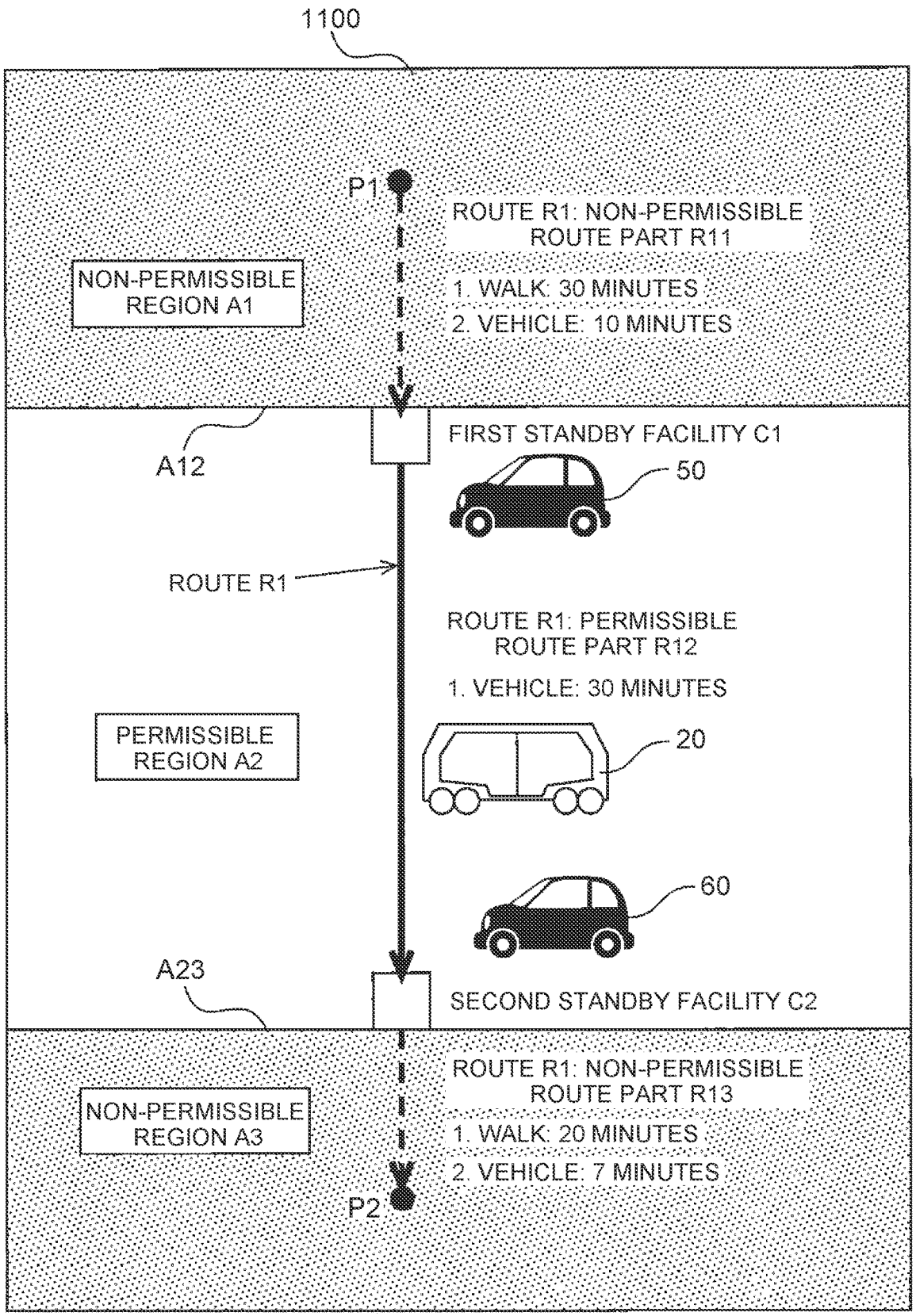
FIG. 11 is a diagram (part 1) for describing an image on a display unit of the terminal.

FIG. 11 shows an image 1100 that is displayed on the display unit 33 of the terminal 30 described later.

The image 1100 shows a route R1 from a current place P1 of the user 40 to a destination P2. The route R1 is searched for by the route search unit 11a. On the image 1100, each of a permissible region A2 and non-permissible regions A1, A3 is shown in a map region containing the route R1.

As shown in FIG. 11, a first standby facility C1 is disposed in a predetermined range from a border A12 between the non-permissible region A1 and the permissible region A2. In the first standby facility C1, a vehicle 50 for which a manual driving control is performed and a driver (not illustrated) that operates the vehicle 50 stand by. It is preferable that the first standby facility C1 be disposed within 100 m from the border A12, particularly, within 50 m from the border A12. The first standby facility C1 can be disposed in one of the non-permissible region A1 and the permissible region A2. In the example shown in FIG. 11, the first standby facility C1 is disposed at a position that is in the permissible region A2 and that is adjacent to the border A12. In the present description, the border A12 sometimes contains a predetermined range from the border A12 between the non-permissible region A1 and the permissible region A2.

The driver that stands by in the first standby facility C1 can operate the vehicle 50 for which the manual driving control is performed, can pick up the user 40 in the non-permissible region A1, and can transport the riding user 40 to the first standby facility C1. The vehicle 50 that is operated by the driver is permitted to travel in the permissible region A2 and the non-permissible regions A1, A3.

Similarly, a second standby facility C2 is disposed in a predetermined range from a border A23 between the permissible region A2 and the non-permissible region A3. In the second standby facility C2, a vehicle 60 for which the manual driving control is performed and a driver (not illustrated) that operates the vehicle 60 stand by. It is preferable that the second standby facility C2 be disposed within 100 m from the border A23, particularly, within 50 m from the border A23. The second standby facility C2 can be disposed in one of the permissible region A2 and the non-permissible region A3. In the example shown in FIG. 11, the second standby facility C2 is disposed at a position that is in the permissible region A2 and that is adjacent to the border A23. In the present description, the border A23 sometimes contains a predetermined range from the border A23 between the permissible region A2 and the non-permissible region A3.

The driver that stands by in the second standby facility C2 can operate the vehicle 60 in which the user 40 rides, and can transport the user 40 from the second standby facility C2 to the destination P2. The vehicle 60 that is operated by the driver is permitted to travel in the permissible region A2 and the non-permissible regions A1, A3.

It is preferable that the route search unit 11a search for the route R1 from the current place P1 of the user 40 to the destination P2, such that the user 40 goes through the first standby facility C1 and the second standby facility C2. Thereby, it is possible to efficiently perform the dispatch of the vehicle 50 from the first standby facility C1 to the user 40 in the non-permissible region A1, the transport of the riding user 40 to the first standby facility C1, and the transfer of the user 40 to the vehicle 20 in the permissible region A2. Further, it is possible to efficiently perform the transfer of the user 40 to the vehicle 60 after the arrival at the second standby facility C2 and the transport to the destination P2 in the non-permissible region A3. For example, the route search unit 11a may obtain the route R1, by first searching for the route using the Dijkstra's algorithm, and next changing the route, which has been searched for, such that the user 40 goes through the first standby facility C1 at the border A12 and goes through the second standby facility C2 at the border A23.

Next, in step S805, the partial route decision unit 11b of the control unit 11 in the server 10 decides the permissible route part and non-permissible route part of the route R1, which has been searched for.

In the example shown in FIG. 11, the partial route decision unit 11b decides that a part of the route R1 that is contained in the non-permissible region A1 from the current place P1 of the user 40 to the first standby facility C1 is a non-permissible route part R11. Further, the partial route decision unit 11b decides that a part of the route R1 that is contained in the permissible region A2 from the first standby facility C1 to the second standby facility C2 is a permissible route part R12. Further, the partial route decision unit 11b decides that a part of the route R1 that is contained in the non-permissible region A3 from the second standby facility C2 to the destination P2 is a permissible route part R13.

Next, in step S807, the partial route decision unit 11b estimates a movement time for which the user 40 riding in the vehicle 20 moves along the permissible route part R12 of the route R1 that is contained in the permissible region A2. For example, the partial route decision unit 11b may refer to the information stored in the storage unit 12, and may estimate a movement time for which the vehicle 20 moves along the permissible route part R12, based on the distances of the links contained in the permissible route part R12 and the legal speed of the links.

Further, the partial route decision unit 11b estimates a movement time for which the user 40 moves along the non-permissible route part R11 of the route R1 that is contained in the non-permissible region A1, based on a movement method that can be selected by the user 40. In the embodiment, the partial route decision unit 11b uses walk and the manual driving vehicle, as the movement method that can be selected by the user 40. For example, in the case where the movement method is the walk, the partial route decision unit 11b may set an average movement speed to 4 km/h, and may estimate the movement time for which the user 40 moves along the non-permissible route part R11, based on the distances of the links contained in the non-permissible route part R11. Further, in the case where the movement method is the manual driving vehicle, the partial route decision unit 11b may estimate the movement time for which the manual driving vehicle moves along the non-permissible route part R11, based on the distances of the links contained in the non-permissible route part R11 and the legal speeds of the links.

Similarly, the partial route decision unit 11b estimates a movement time for which the user 40 moves along the non-permissible route part R13 of the route R1 that is contained in the non-permissible region A3, based on a movement method that can be selected by the user 40.

Next, in step S809, the partial route decision unit 11b generates display information about the route for displaying the route R1 on the terminal 30. The display information about the route includes information about the permissible route part R12, the non-permissible route part R11 and the non-permissible route part R13. Further, the display information about the route R1 includes the movement time for the permissible route part R12, the movement time for the non-permissible route part R11, and the movement time for the non-permissible route R13. It is preferable that the partial route decision unit 11b generate the display information such that the permissible route part R12 and the non-permissible route parts R11, R13 are displayed in a discriminable manner.

Next, in step S811, the partial route decision unit 11b sends the display information about the route R1 to the terminal 30 through the network N, using the communication I/F 15.

Next, in step S813, the terminal 30 displays the display information about the route R1, on the display unit 33.

As shown in FIG. 11, the image 1100 displayed on the display unit 33 includes the map region containing the route R1, the permissible region A2 and the non-permissible regions A1, A3. The image 1100 shows the non-permissible route part R11, the permissible route part R12 and the non-permissible route part R13, in a discriminable manner. On the image 1100, the permissible route part R12 is shown by a solid line, and the non-permissible route part R11 and the non-permissible route part R13 are shown by chain lines. Thereby, the user 40 is assisted to make a plan for the movement from the current place P1 to the destination P2, while clearly recognizing the section where the automatic driving vehicle can be used and the section where the automatic driving vehicle cannot be used.

Further, the image 1100 shows the movement time for which the user 40 moves along the non-permissible route part R11, using the movement method that can be selected by the user 40. The movement method that can be selected by the user 40 is the walk or the vehicle. In the case where the walk is selected, the movement time is 30 minutes, and in the case where the vehicle is selected, the movement time is 10 minutes. Thereby, the user 40 is assisted to estimate the hour of the arrival at the destination P1.

Similarly, the image 1100 shows the movement time for which the user 40 moves along the non-permissible route part R13, using the movement method that can be selected by the user 40. The movement method that can be selected by the user 40 is the walk or the vehicle. In the case where the walk is selected, the movement time is 20 minutes, and in the case where the vehicle is selected, the movement time is 7 minutes.

As the movement method for the permissible route part R12 in the permissible region A2, the vehicle 20 for which the automatic driving control is performed is selected, and therefore, the movement time (30 minutes) with the vehicle 20 is shown on the image 1100.

Next, in step S815, the terminal 30 is operated by the user 40, to input the movement method for the non-permissible route part R11 and the movement method for the non-permissible route R13. In the embodiment, the user 40 selects the vehicle as the movement method for the non-permissible route part R11, and selects the vehicle as the movement method for the non-permissible route part R13.

Next, in step S817, the terminal 30 is operated by the user 40, to send information indicating the movement method for the non-permissible route part R11 and the movement method for the non-permissible route part R13, to the server 10 through the network N, together with the dispatch request.

Next, in step S819, the dispatch service unit 11d of the control unit 11 in the server 10 estimates a first arrival time at which the user 40 arrives at the first standby facility C1, using the movement method selected for the non-permissible route part R11. Specifically, the dispatch service unit 11d estimates the first arrival time in the case where the vehicle 50 that is operated by the driver moves along the non-permissible route part R11 from the first standby facility C1 to the current place P1 of the user 40, causes the user 40 to gets in the vehicle 50 at the position P1, moves along the non-permissible route part R11 from the position P1 to the first standby facility C1, and arrives at the first standby facility C1. Then, the dispatch service unit 11d generates a first dispatch instruction instructing the driver standing by in the first standby facility C1 to move to the current place P1 of the user 40 by the first arrival time, and transport the riding user 40 to the first standby facility C1.

Further, the dispatch service unit 11d retrieves vehicles 20 that exist in a certain distance from the first standby facility C1 within the permissible region A2, and selects an available unmanned vehicle 20 from at least one retrieved vehicle 20. Then, the dispatch service unit 11d generates a second dispatch instruction instructing the vehicle 20 to move to the first standby facility C1 by the first arrival time, and transport the riding user 40 along the permissible route part R12 to the second standby facility C2.

Further, the dispatch service unit 11d estimates a second arrival time at which the vehicle 20 arrives at the second standby facility C2 after causing the user 40 to get in the vehicle 20 at the first standby facility C1 and moving along the permissible route part R12 from the first standby facility C1 to the second standby facility C2. Then, the dispatch service unit 11d generates a third dispatch instruction instructing the driver standing by in the second standby facility C2 to arrive at the second standby facility C2 by the second arrival time, cause the user 40 to get in the vehicle 60 at the second standby facility C2, and transport the riding user 40 along the non-permissible route part R13 to the destination P2.

Next, in step S901, the dispatch service unit 11d sends information indicating the first dispatch instruction and the non-permissible route part R11, to an in-vehicle device (not illustrated) that is mounted on the vehicle 50 standing by in the first standby facility C1, through the network N. The driver standing by in the first standby facility C1 is notified of the first dispatch instruction, by watching the first dispatch instruction and the non-permissible route part R11 that are displayed on the in-vehicle device mounted on the vehicle 50. The dispatch service unit 11d may send the information indicating the first dispatch instruction and the non-permissible route part R11, to a terminal (not illustrated) of the driver standing by in the first standby facility C1, through the network N.

Next, in step S903, the dispatch service unit 11d sends information indicating the second dispatch instruction and the permissible route part R12, to the vehicle 20 through the network N.

Next, in step S905, the dispatch service unit 11d sends information indicating the third dispatch instruction and the non-permissible route part R13, to an in-vehicle device (not illustrated) that is mounted on the vehicle 60 standing by in the second standby facility C2, through the network N. The driver standing by in the second standby facility C2 is notified of the third dispatch instruction, by watching the third dispatch instruction and the non-permissible route part R13 that are displayed on the in-vehicle device mounted on the vehicle 60. The dispatch service unit 11d may send the information indicating the third dispatch instruction and the non-permissible route part R13, to a terminal (not illustrated) of the driver standing by in the second standby facility C2, through the network N.

Next, in step S907, the vehicle 50 is operated by the driver, to move along the non-permissible route part R11 from the first standby facility C1 to the current place P1 of the user 40.

Next, in step S909, the user 40 gets in the vehicle 50 at the position P1.

Next, in step S911, the in-vehicle device (not illustrated) of the vehicle 50 is operated by the driver, to send a getting-in notice indicating that the user 40 has got in the vehicle 50, to the server 10 through the network N. The server 10 receives the getting-in notice, and is notified that the user 40 has got in the vehicle 50. The dispatch service unit 11d stores the received notice in the storage unit 12, as a log.

Next, in step S913, the vehicle 50 is operated by the driver, to move along the non-permissible route part R11 from the position P1 to the first standby facility C1.

Next, in step S915, the user 40 gets out of the vehicle 50 at the first standby facility C1.

Next, in step S917, the in-vehicle device (not illustrated) of the vehicle 50 is operated by the driver, to sends a getting-out notice indicating that the user 40 has got out of the vehicle 50, to the server 10 through the network N. The server 10 receives the getting-out notice, and is notified that the user 40 has got out of the vehicle 50. Thereafter, the vehicle 50 stands by in the first standby facility C1.

Next, in step S919, the user 40 gets in the vehicle 20 that stands by in the first standby facility C1.

Next, in step S921, the automatic driving control unit 21 of the vehicle 20 detects that the user 40 has got in the vehicle 20, based on the picture picked up by the unillustrated vehicle-interior camera, and then, sends a getting-in notice indicating that the user 40 has got in the vehicle 20, to the server 10 through the network N. The server 10 receives the getting-in notice, and is notified that the user 40 has got in the vehicle 20.

Next, in step S923, the vehicle 20 moves along the permissible route part R12 from the first standby facility C1 to the second standby facility C2. The dispatched vehicle 20 has no mechanism for the manual driving control, and the user 40 is not permitted to operate the vehicle 20.

Next, in step S925, the user 40 gets out of the vehicle 20 at the second standby facility C2.

Next, in step S927, the automatic driving control unit 21 of the vehicle 20 detects that the user 40 has got out of the vehicle 20, based on the picture picked up by the unillustrated vehicle-interior camera, and then, sends a getting-out notice indicating that the user 40 has got out of the vehicle 20, to the server 10 through the network N. The server 10 receives the getting-out notice, and is notified that the user 40 has got out of the vehicle 60. Thereafter, the vehicle 20 can provide the mobility service to another user in the permissible region A2.

Next, in step S1001, the user 40 gets in the vehicle 60 that stands by in the second standby facility C2.

Next, in step S1003, the in-vehicle device (not illustrated) of the vehicle 60 is operated by the driver, to send a getting-in notice indicating that the user 40 has got in the vehicle 60, to the server 10 through the network N. The server 10 receives the getting-in notice, and is notified that the user 40 has got in the vehicle 60.

Next, in step S1005, the vehicle 50 is operated by the driver, to move along the non-permissible route part R13 from the second standby facility C2 to the destination P2.

Next, in step S1007, the user 40 gets out of the vehicle 60 at the destination P2. Thereby, the user 40 can move to the destination P2, with the mobility service that is provided by the system 1.

Next, in step S1009, the in-vehicle device (not illustrated) of the vehicle 50 is operated by the driver, to send a getting-out notice indicating that the user 40 has got out of the vehicle 60, to the server 10 through the network N. The server 10 receives the getting-out notice, and is notified that the user 40 has got out of the vehicle 60. Thereafter, the vehicle 50 is operated by the driver, to return to the second standby facility C2 and stand by.

Figure 12:
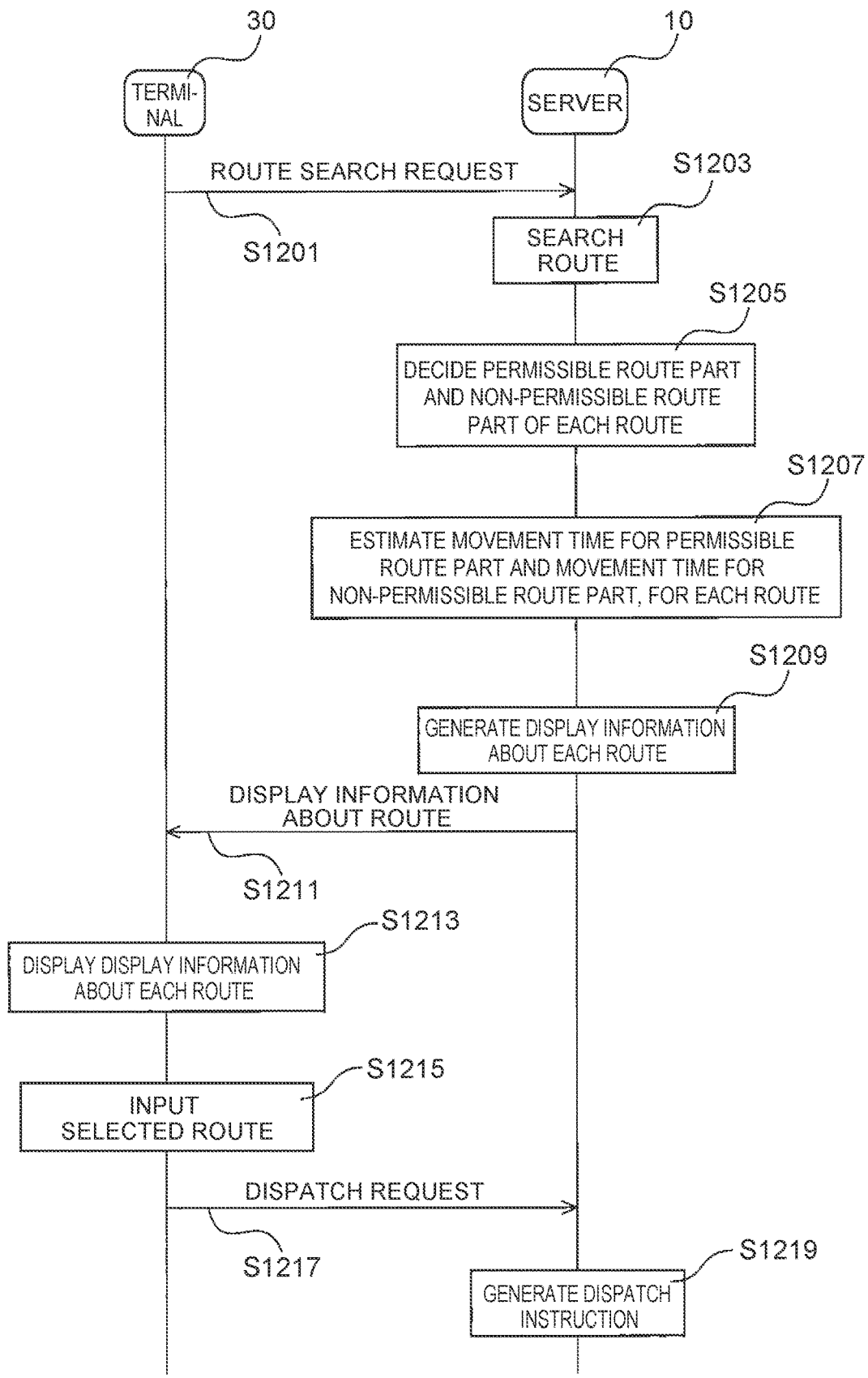
FIG. 12 is a sequence diagram (part 4) for describing a behavior of the system.
Figure 13:
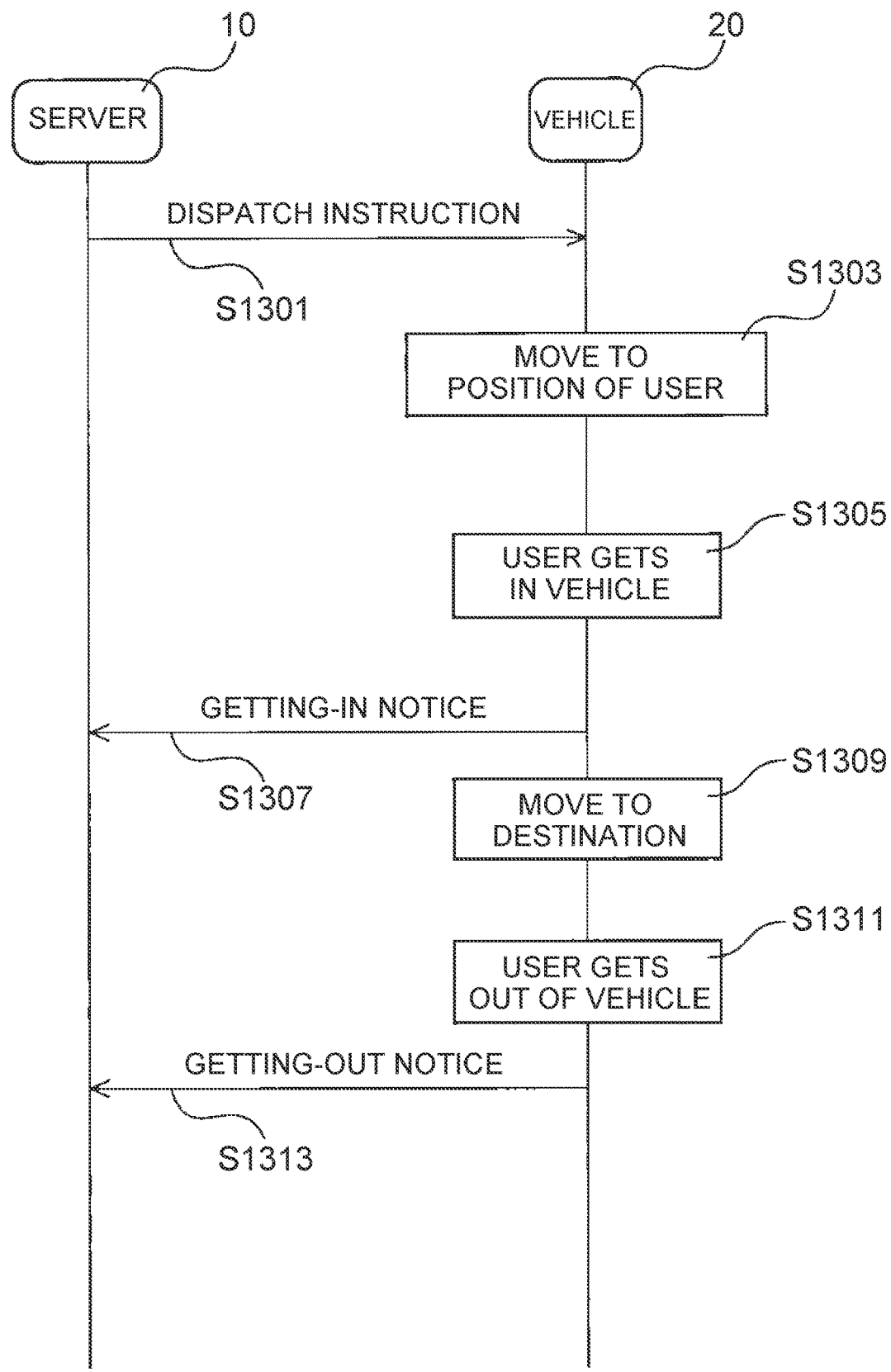
FIG. 13 is a sequence diagram (part 5) for describing a behavior of the system.

Next, a second behavior example when the above-described system 1 provides the mobility service for transporting the user 40 to the destination will be described below, with reference to sequence diagrams shown in FIG. 12 and FIG. 13.

First, in step S1201, using the terminal 30, the user 40 sends the information indicating the current place and the destination, to the server 10 through the network N, together with the route search request for the search of the route from the current place to the destination.

Next, in step S1203, the route search unit 11a of the control unit 11 in the server 10 searches for the route from the current place of the user 40 to the destination, with reference to the map data 12b stored in the storage unit 12. In the embodiment, the route search unit 11a searches for a plurality of routes in each of which the traveling route is equal to or shorter than a predetermined distance, and in the case where such routes are searched for, the route search unit 11a outputs the routes, which have been searched for.

Figure 14:
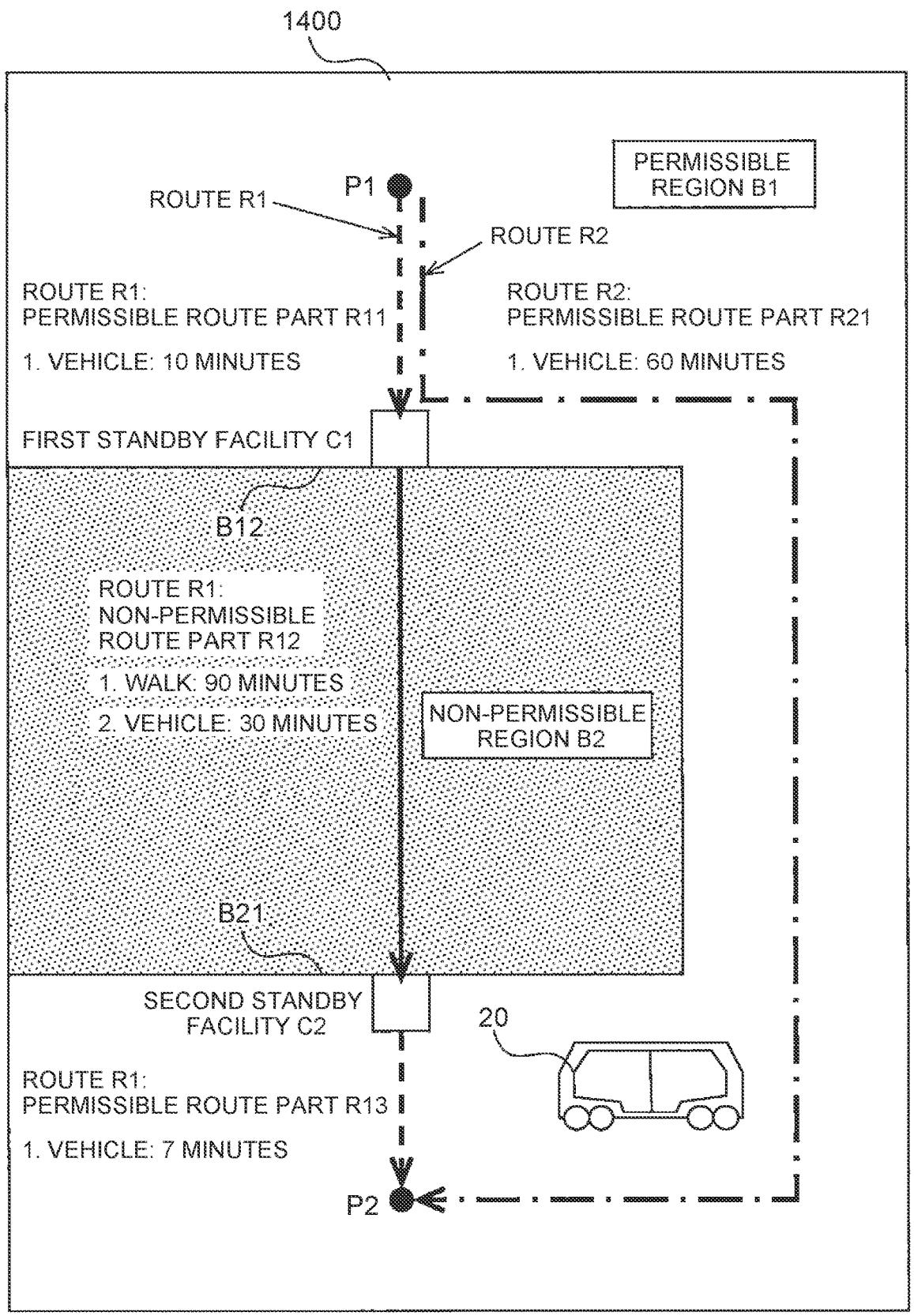
FIG. 14 is a diagram (part 2) for describing an image on the display unit of the terminal.

FIG. 14 shows an image 1400 that is displayed on the display unit 33 of the terminal 30 described later.

The image 1400 shows two routes R1, R2 from the current place P1 of the user 40 to the destination P2. The routes R1, R2 are searched for by the route search unit 11a. On the image 1400, each of a permissible region B1 and a non-permissible region B2 is shown in a map region containing the two routes R1, R2.

As shown in FIG. 14, a first standby facility C1 is disposed in a predetermined range from a border B12 between the permissible region B1 and the non-permissible region B2. In the example shown in FIG. 14, the first standby facility C1 is disposed at a position that is in the permissible region B1 and that is adjacent to the border B12.

Further, a second standby facility C2 is disposed in a predetermined range from a border B21 between the non-permissible region B2 and the permissible region B1. In the example shown in FIG. 14, the second standby facility C2 is disposed at a position that is in the permissible region B1 and is adjacent to the border B21.

It is preferable that the route search unit 11a search for the route R1 from the current place P1 of the user 40 to the destination P2 such that the user 40 passes through the permissible region B1 and the non-permissible region B2 via the first standby facility C1 and the second standby facility C2.

Next, in step S1205, the partial route decision unit 11b of the control unit 11 in the server 10 decides the permissible route part and the non-permissible route part of each of the two routes R1, R2.

In the example shown in FIG. 14, for the route R1, the partial route decision unit 11b decides that a part of the route R1 that is contained in the permissible region B1 from the current place P1 of the user 40 to the first standby facility C1 is a permissible route part R11. Further, the partial route decision unit 11b decides that a part of the route R1 that is contained in the non-permissible region B2 from the first standby facility C1 to the second standby facility C2 is a non-permissible route part R12. Further, the partial route decision unit 11b decides that a part of the route R1 that is contained in the permissible region B1 from the second standby facility C2 to the destination P2 is a permissible route part R13.

Further, for the route R2, the partial route decision unit 11b decides that a part of the route R2 that is contained in the permissible region B1 from the current place P1 of the user 40 to the destination P2 is a permissible route part R21. The route R2 has no non-permissible route part that is contained in the non-permissible region B2.

Incidentally, first, the route search unit 11a may search for a first route (corresponding to the route R1), and in the case where the first route has the permissible route part and the non-permissible route part, the route search unit 11a may search for a second route (corresponding to the route R2) that allows the user 40 to move from the position P1 to the destination P2 so as to pass only through the permissible region.

Next, in step S1207, the partial route decision unit 11b estimates movement times for the permissible route part and the non-permissible route part, for each of the two routes R1, R2.

For the route R1, the partial route decision unit 11b estimates a movement time for which the user 40 riding in the vehicle 20 moves along the permissible route part R12 contained in the permissible region B1 and a movement time for which the user 40 moves along the permissible route part R13 contained in the permissible region B1. Further, the partial route decision unit 11b estimates a movement time for which the user 40 moves along the non-permissible route part R12 contained in the non-permissible region B2, based on a movement method that can be selected by the user 40. In the embodiment, the partial route decision unit 11b uses the walk or the manual driving vehicle, as the movement method that can be selected by the user 40.

Further, for the route R2, the partial route decision unit 11b estimates a movement time for which the user 40 riding in the vehicle 20 moves along the permissible route part R21.

Next, in step S1209, the partial route decision unit 11b generates display information about the route for displaying the two routes R1, R2 on the terminal 30. The display information about the route R1 includes information about the permissible route part R12 and the permissible route part R13 and information about the non-permissible route part R12. Further, the display information about the route R1 includes the movement times for the permissible route part R12 and the permissible route part R13 and the movement time for the non-permissible route part R12. It is preferable that the partial route decision unit 11b generate the display information such that the permissible route parts R12, R13 and the non-permissible route part R12 are displayed in a discriminable manner.

Next, in step S1211, the partial route decision unit 11b sends the display information about the two routes R1, R2 to the terminal 30 through the network N, using the communication I/F 15.

Next, in step S1213, the terminal 30 displays the display information about the two routes R1, R2, on the display unit 33.

As shown in FIG. 14, the image 1400 displayed on the display unit 33 includes the map region containing the two routes R1, R2, the permissible region B1 and the non-permissible region B2. For the route R1, the image 1400 shows the permissible route part R11, the non-permissible route part R12 and the permissible route part R13, in a discriminable manner. On the image 1400, the permissible route part R11 and the permissible route part R13 are shown by chain lines, and the non-permissible route part R12 is shown by a solid line.

Further, for the route R2, the image 1400 shows the permissible route part R21. On the image 1400, the route R2 is shown by a dashed-dotted line. The permissible route part R21 of the route R2 is shown so as to be discriminable from the permissible route part R11 and permissible route part R13 of the route R1.

Thereby, the user 40 can clearly recognize the section where the automatic driving vehicle can be used and the section where the automatic driving vehicle cannot be used, for the route R1. Further, the user 40 can clearly recognize that the route R2 allows the user 40 to move from the current place P1 to the destination P2 using the automatic driving vehicle. The user 40 is assisted to make a plan for the movement from the current place P1 to the destination P2.

The image 1400, for the route R1, shows the movement time for which the user 40 moves along the non-permissible route part R12, using the movement method that can be selected by the user 40. The movement method that can be selected by the user 40 is the walk or the vehicle. In the case where the walk is selected, the movement time is 90 minutes, and in the case where the vehicle is selected, the movement time is 30 minutes.

As the movement method for the permissible route part R11 and permissible route part R13 in the permissible region A2, the vehicle 20 for which the automatic driving control is performed is selected, and therefore, the movement times (10 minutes and 7 minutes) for the vehicle 20 are shown on the image 1400.

Further, for the route R2 in the permissible region B1, the movement time (60 minutes) for the vehicle 20 is shown on the image 1400.

Next, in step S1215, the terminal 30 is operated by the user 40, to input the route 2 as the selected route. By selecting the route 2, the user 40 can move from the current place P1 to the destination P2, without transfer of vehicles.

Next, in step S1217, the terminal 30 is operated by the user 40, to send information indicating the selected route 2, to the server 10 through the network N, together with the dispatch request.

Next, in step S1219, the dispatch service unit 11d of the control unit 11 in the server 10 retrieves vehicles 20 that exist in a certain distance from the current place P1 of the user 40 within the permissible region B1, and selects an available unmanned vehicle 20 from at least one retrieved vehicle 20. Then, the dispatch service unit 11d generates a dispatch instruction instructing the vehicle 20 to move to the position P1 and transport the riding user 40 along the permissible route part R21 to the destination P2.

Next, in step S1301, the dispatch service unit 11d sends information indicating the dispatch instruction and the permissible route part R21, to the vehicle 20 through the network N.

Next, in step S1303, the vehicle 20 receives the information indicating the dispatch instruction and the permissible route part R21, and moves to the current place P1 of the user 40.

Next, in step S1305, the user 40 gets in the vehicle 20 at the position P1.

Next, in step S1307, the automatic driving control unit 21 of the vehicle 20 detects that the user 40 has got in the vehicle 20, based on the picture picked up by the unillustrated vehicle-interior camera, and then, sends a getting-in notice indicating that the user 40 has got in the vehicle 20, to the server 10 through the network N. The server 10 receives the getting-in notice, and is notified that the user 40 has got in the vehicle 20.

Next, in step S1309, the vehicle 20 moves along the permissible route part R21 from the position P1 to the destination P2.

Next, in step S1311, the user 40 gets out of the vehicle 20 at the second standby facility C2. Thereby, the user 40 can move to the destination P2 without transfer of vehicles, with the mobility service that is provided by the system 1.

Next, in step S1313, the automatic driving control unit 21 of the vehicle 20 detects that the user 40 has got out of the vehicle 20, based on the picture picked up by the unillustrated vehicle-interior camera, and then, sends a getting-out notice indicating that the user 40 has got out of the vehicle 20, to the server 10 through the network N. The server 10 receives the getting-out notice, and is notified that the user 40 has got out of the vehicle 60. Thereafter, the vehicle 20 can provide the mobility service to another user in the permissible region B1.

With the above-described system in the embodiment, as shown in the first behavior example, the user is assisted to make a plan for the movement from the current place to the destination, while clearly recognizing the section where the automatic driving vehicle can be used and the section where the automatic driving vehicle cannot be used.

With the system in the embodiment, as shown in the second behavior example, the user is assisted to make a plan for the movement from the current place to the destination, while comparing a route that allows the user to move from the current place to the destination using only the automatic driving vehicle and a route that does not allow the user to move from the current place to the destination using only the automatic driving vehicle.

The route information decision device, the route information system, the terminal and the method for deciding the route information in the above-described embodiment can be appropriately modified, without departing from the spirit of the disclosure.

For example, in the above-described first behavior example, the server dispatches the manual driving vehicle that stands by in the first standby facility, to the user in the non-permissible region. However, the server may dispatch the manual driving vehicle in the non-permissible region or the permissible region, to the user in the non-permissible region.

Further, in the above-described first behavior example, the server dispatches the manual driving vehicle that stands by in the second standby facility, to the user having arrived at the border between the permissible region and the non-permissible region. However, the server may dispatch the manual driving vehicle in the non-permissible region or the permissible region, to the user at the border between the permissible region and the non-permissible region.

Further, in the above-described first behavior example, the user 40 transfers from the manual driving vehicle to the automatic driving vehicle at the time when the user 40 moves from the non-permissible region A1 to the permissible region A2. However, the user 40 may get in the manual driving vehicle at the current place, and may move from the current place to the destination.

Further, in the above-described embodiment, the weather information, the traffic information, the hour information and the area information are used as the driving environment information. However, the driving environment information is not limited to the weather information, the traffic information, the hour information and the area information. The driving environment information may include other information, if the other information possibly influences the safety of the traveling of the vehicle for which the automatic driving control is performed. Further, the weather information, the traffic information, the hour information or the area information is not limited to the above-described specific information. The weather information, the traffic information, the hour information or the area information may further include other specific information.

What is claimed is:

1. A route information decision device comprising:
   at least one processor configured to execute a program to:
   search for a route along which a user moves from a first spot to a second spot; and
   decide a permissible route part of the route for travel by a first vehicle for which an automatic driving control is performed and a non-permissible route part of the route for travel by a second vehicle for which manual driving is performed, the permissible route part being contained in a permissible region where the first vehicle is permitted to be dispatched to the user, the non-permissible route part being contained in a non-permissible region where the first vehicle is not permitted to be dispatched to the user.

2. The route information decision device according to claim 1, wherein the at least one processor is further configured to display information for displaying the permissible route part and the non-permissible route part in a discriminable manner.

3. The route information decision device according to claim 1, wherein the at least one processor is further configured to estimate a first movement time, estimate a second movement time, and notify the user of the first movement time and the second movement time, the first movement time being a time for which the user moves along the permissible route part while riding in the automatic driving vehicle, the second movement time being a time for which the user moves along the non-permissible route part while riding in the manual driving vehicle.

4. The route information decision device according to claim 1, wherein:
   the route contains a course along which the user moves from the first spot in the non-permissible region through the permissible region to the second spot; and
   the at least one processor is further configured to:
   estimate an arrival time at which the user arrives at a border between the non-permissible region and the permissible region on the route, based on an estimated travel time in the manual driving vehicle along the non-permissible route part, and
   generate a dispatch instruction instructing the vehicle to arrive by the arrival time at a spot in a first predetermined range from the border.

5. The route information decision device according to claim 1, wherein:
   based on a facility in which the manual driving vehicle and a driver stand by being disposed in a second predetermined range from a border between the permissible region and the non-permissible region, the at least one processor is further configured to search for the route such that the user goes through the facility.

6. The route information decision device according to claim 1, wherein the at least one processor is further configured to decide the permissible region and the non-permissible region based on driving environment information to influence safety of traveling of the vehicle.

7. A route information system comprising:
a terminal configured to send a search request, the search request being a request for a search of a route along which a user moves from a first spot to a second spot; and
a server comprising:
a communication unit,
a route search unit configured to search for the route based on the search request received using the communication unit, and
a partial route decision unit configured to decide a permissible route part of the route for travel by an automatic driving vehicle for which an automatic driving control is performed and a non-permissible route part of the route for travel by a manual driving vehicle for which manual driving is performed, the permissible route part being contained in a permissible region where the automatic driving vehicle is permitted to be dispatched to the user, the non-permissible route part being contained in a non-permissible region where the automatic driving vehicle is not permitted to be dispatched to the user.

8. A terminal comprising:
a communication unit; and
a control unit configured to send a search request to a server using the communication unit, the search request being a request for a search of a route along which a user moves from a first spot to a second spot, the server searching for the route based on the search request, the server deciding a permissible route part of the route for travel by an automatic driving vehicle for which an automatic driving control is performed and a non-permissible route part of the route for travel by a manual driving vehicle for which manual driving is performed, the permissible route part being contained in a permissible region where the automatic driving vehicle is permitted to be dispatched to the user, the non-permissible route part being contained in a non-permissible region where the automatic driving vehicle is not permitted to be dispatched to the user.

9. A method for deciding route information, the method comprising:
searching for a route along which a user moves from a first spot to a second spot; and
deciding a permissible route part of the route for travel by an automatic driving vehicle for which an automatic driving control is performed and a non-permissible route part of the route for travel by a manual driving vehicle for which manual driving is performed, the permissible route part being contained in a permissible region where the automatic driving vehicle is permitted to be dispatched to the user, the non-permissible route part being contained in a non-permissible region where the automatic driving vehicle is not permitted to be dispatched to the user.

10. The route information decision device according to claim 1, wherein the first spot is a starting point and the second spot is a destination,
wherein the non-permissible region is travelled by the manual driving vehicle and the permissible region is driven by the automatic driving vehicle, and
wherein the at least one processor is further configured to:
dispatch the manual driving vehicle to the first spot;
dispatch the automatic driving vehicle to a boundary between the non-permissible region and the permissible region; and
dispatch another manual driving vehicle to the boundary between the permissible region and the non-permissible region.

11. The route information system according to claim 7, wherein the first spot is a starting point and the second spot is a destination,
wherein the non-permissible region is travelled by the manual driving vehicle and the permissible region is driven by the automatic driving vehicle, and
wherein the server is further configured to:
dispatch the manual driving vehicle to the first spot;
dispatch the automatic driving vehicle to a boundary between the non-permissible region and the permissible region; and
dispatch another manual driving vehicle to the boundary between the permissible region and the non-permissible region.

12. The terminal according to claim 8, wherein the first spot is a starting point and the second spot is a destination,
wherein the non-permissible region is travelled by the manual driving vehicle and the permissible region is driven by the automatic driving vehicle, and
wherein the control unit further configured to:
dispatch the manual driving vehicle to the first spot;
dispatch the automatic driving vehicle to a boundary between the non-permissible region and the permissible region; and
dispatch another manual driving vehicle to the boundary between the permissible region and the non-permissible region.

13. The method according to claim 9, wherein the first spot is a starting point and the second spot is a destination,
wherein the non-permissible region is travelled by the manual driving vehicle and the permissible region is driven by the automatic driving vehicle, and
the method further comprising:
dispatching the manual driving vehicle to the first spot;
dispatching the automatic driving vehicle to a boundary between the non-permissible region and the permissible region; and
dispatching another manual driving vehicle to the boundary between the permissible region and the non-permissible region.

14. The route information decision device according to claim 1, wherein the at least one processor is further configured to:
decide the permissible part of the route based on the permissible part of the route being located within the permissible region; and
decide the non-permissible part of the route based on the permissible part of the route being located within the non-permissible region.

15. The route information system according to claim 7, wherein the control unit is further configured to:
decide the permissible part of the route based on the permissible part of the route being located within the permissible region; and decide the non-permissible part of the route based on the permissible part of the route being located within the non-permissible region.

16. The terminal according to claim 8, wherein the partial route decision unit is further configured to:
- decide the permissible part of the route based on the permissible part of the route being located within the permissible region; and
- decide the non-permissible part of the route based on the permissible part of the route being located within the non-permissible region.

17. The method of claim 9, wherein the deciding a permissible route part of the route for travel by a first vehicle for which an automatic driving control is performed and a non-permissible route part of the route for travel by a second vehicle for which manual driving is performed comprises:
- deciding the permissible part of the route based on the permissible part of the route being located within the permissible region; and
- deciding the non-permissible part of the route based on the permissible part of the route being located within the non-permissible region.

* * * * *